United States Patent
Wu et al.

(10) Patent No.: US 11,099,267 B2
(45) Date of Patent: *Aug. 24, 2021

(54) EXTENDED DOPPLER PMCW CODE DIVISION MIMO RADAR

(71) Applicant: NXP USA, Inc., Austin, TX (US)

(72) Inventors: Ryan Haoyun Wu, San Jose, CA (US); Chunshu Li, Davis, CA (US); Arunesh Roy, San Jose, CA (US)

(73) Assignee: NXP USA, INC., Austin, TX (US)

( * ) Notice: Subject to any disclaimer, the term of this patent is extended or adjusted under 35 U.S.C. 154(b) by 304 days.

This patent is subject to a terminal disclaimer.

(21) Appl. No.: 16/224,050

(22) Filed: Dec. 18, 2018

(65) Prior Publication Data

US 2020/0191940 A1 Jun. 18, 2020

(51) Int. Cl.
*G01S 13/58* (2006.01)
*G01S 7/292* (2006.01)
(Continued)

(52) U.S. Cl.
CPC ............ *G01S 13/582* (2013.01); *G01S 7/292* (2013.01); *G01S 13/325* (2013.01);
(Continued)

(58) Field of Classification Search
CPC .... G01S 13/325; G01S 13/931; G01S 13/582; G01S 13/878; G01S 7/292; G01S 7/352;
(Continued)

(56) References Cited

U.S. PATENT DOCUMENTS 5,525,990 A 6/1996 Lewis
5,832,028 A * 11/1998 Durrant ............... H04L 27/2014
375/150

(Continued)

FOREIGN PATENT DOCUMENTS

WO 2017187330 A1 11/2017

OTHER PUBLICATIONS

Li et al., "MIMO Radar with Colocated Antennas, Review of Some Recent Work" IEEE Signal Processing Magazine, Sep. 2007, 9 pages.

(Continued)

*Primary Examiner* — Olumide Ajibade Akonai

(57) ABSTRACT

Embodiments are provided for a radar system including: an N number of transmit antennas; and an N number of phase shift keying (PSK) coders, each assigned a respective optimized transmitter code of a set of optimized transmitter codes, each optimized transmitter code of the set comprises a sequence of K code chips, each optimized transmitter code of the set is orthogonal to every other optimized transmitter code of the set, spectral analysis of a cross-correlation between any two optimized transmitter codes results in sidelobes no greater than a predetermined detection threshold, each PSK coder encodes K ranging waveform blocks according to the sequence of K code chips of the respective optimized transmitter code and produces a respective optimized coded sequence, and each of the N transmit antennas outputs the respective optimized coded sequence at the same time.

21 Claims, 11 Drawing Sheets

(51) Int. Cl.
*G01S 13/87* (2006.01)
*H04B 7/0413* (2017.01)
*H04J 13/10* (2011.01)
*G01S 13/32* (2006.01)
*G01S 7/35* (2006.01)
*H04J 13/16* (2011.01)
*G01S 7/282* (2006.01)

(52) U.S. Cl.
CPC .......... *G01S 13/878* (2013.01); *H04B 7/0413* (2013.01); *H04J 13/10* (2013.01); *G01S 7/282* (2013.01); *G01S 2007/356* (2013.01); *H04J 13/16* (2013.01)

(58) Field of Classification Search
CPC ........ G01S 13/584; G01S 7/354; G01S 7/032; G01S 13/284; G01S 2013/0254; G01S 2007/356; G01S 13/44; G01S 7/023; G01S 7/282; G01S 13/02; G01S 7/42; H04B 7/0413; H04B 1/707; H04B 1/709; H04L 25/0204; H04J 13/10; H04J 13/16; H04J 13/0003; H04J 13/18; H04J 13/004
See application file for complete search history.

(56) References Cited

U.S. PATENT DOCUMENTS

| | | | |
|---|---|---|---|
| 5,867,119 A * | 2/1999 | Corrubia | G01S 13/9023 342/120 |
| 9,448,302 B2 | 9/2016 | Schoor et al. | |
| 9,541,638 B2 | 1/2017 | Jansen et al. | |
| 9,547,071 B2 | 1/2017 | Vaucher et al. | |
| 9,689,967 B1 | 6/2017 | Stark et al. | |
| 9,791,564 B1 | 10/2017 | Harris et al. | |
| 9,933,520 B1 | 4/2018 | Campbell | |
| 2008/0143587 A1* | 6/2008 | Johnson | G01S 7/411 342/25 R |
| 2009/0079617 A1* | 3/2009 | Shirakawa | G01S 13/87 342/146 |
| 2013/0176166 A1* | 7/2013 | Kishigami | G01S 13/288 342/202 |
| 2017/0160380 A1 | 6/2017 | Searcy et al. | |
| 2017/0212213 A1 | 7/2017 | Kishigami | |
| 2017/0248686 A1 | 8/2017 | Zivkovic et al. | |
| 2017/0254879 A1 | 9/2017 | Tokieda et al. | |
| 2018/0095163 A1* | 4/2018 | Lovberg | G01S 7/023 |
| 2019/0101635 A1 | 4/2019 | Fukushima et al. | |
| 2020/0011983 A1 | 1/2020 | Kageme et al. | |
| 2020/0011985 A1* | 1/2020 | Jenn | G01S 13/325 |
| 2020/0182991 A1 | 6/2020 | Hakobyan et al. | |

OTHER PUBLICATIONS

Garcia, Oscar Faus, "Signal Processing for mmWave MIMO Radar," Master's Thesis in Electronics, University of Gavle, Jun. 2015, 259 pages.
Rao, Sandeep, of Texas Instruments, "MIMO Radar: Application Report, SWRA554," May 2017, 12 pages.
U.S. Appl. No. 16/223,881, filed Dec. 18, 2018, 51 pages.
Dai, X., "Low-sidelobe HRR profiling based on the FDLFM-MIMO radar", 1st Asian and Pacific Conference on Synthetic Aperture Radar, IEEE 2008, pp. 132-135, Nov. 5-9, 2007.
Sturm, C., "Automotive Fast-Chip MIMO Radar with Simultaneous Transmission in a Doppler-Multiplex", 19th International Radar Symposium, IEEE, pp. 1-6, Jun. 2018.
Notice of Allowance dated Mar. 4, 2021 in U.S. Appl. No. 16/223,881.

* cited by examiner

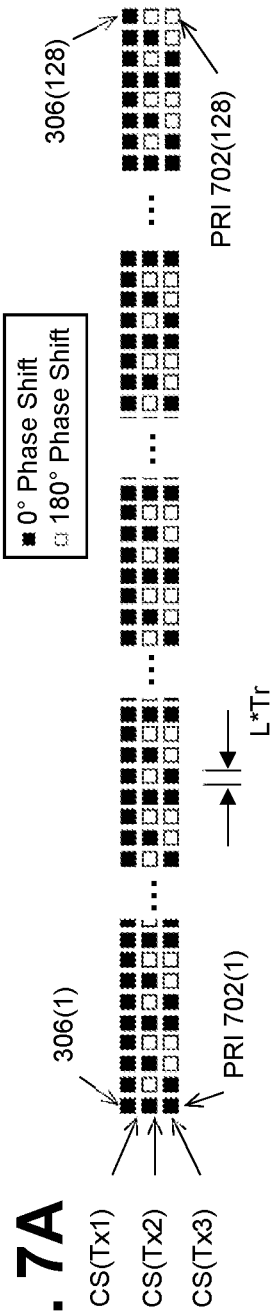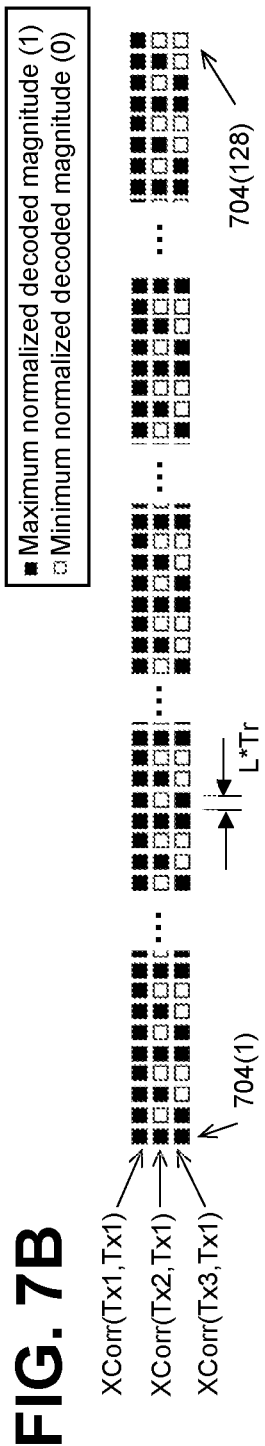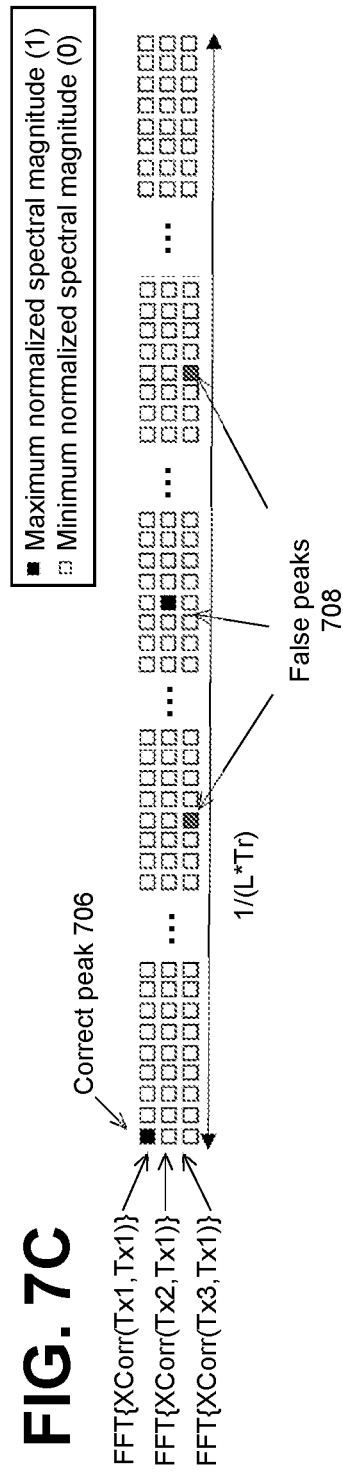

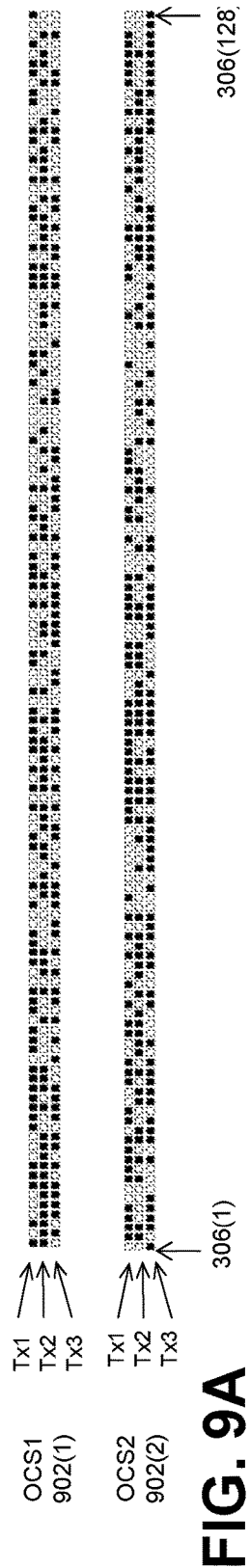
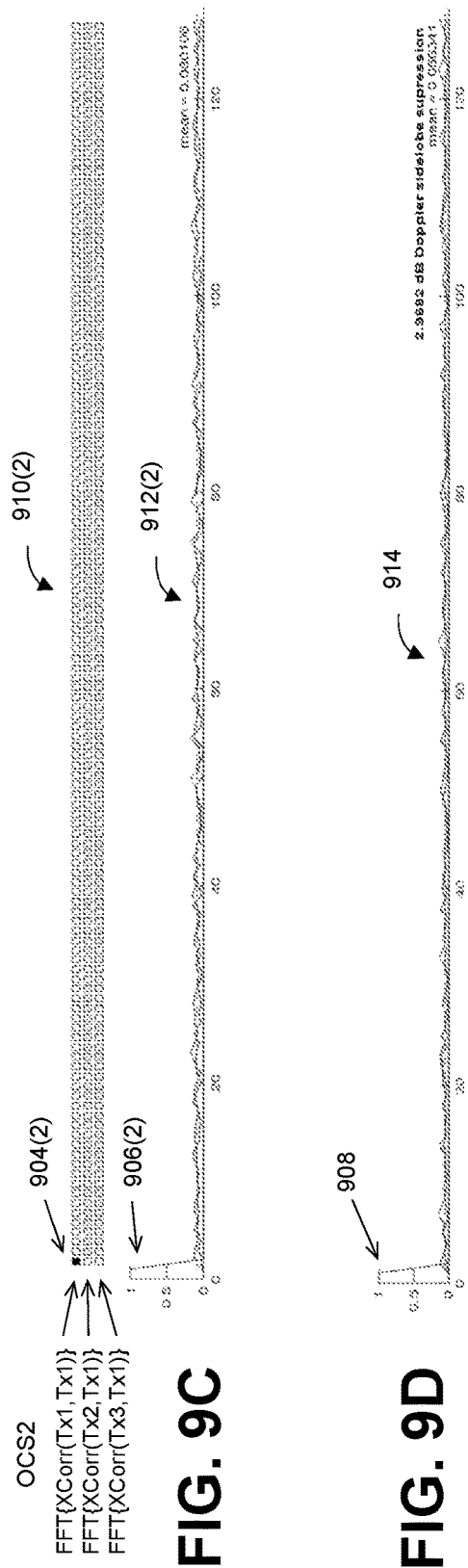
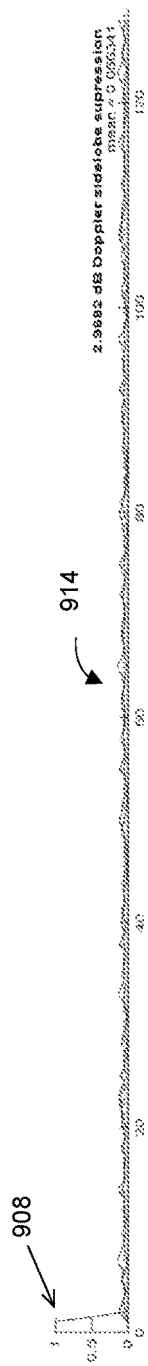
FIG. 9A
FIG. 9B
FIG. 9C
FIG. 9D

EXTENDED DOPPLER PMCW CODE DIVISION MIMO RADAR

BACKGROUND

Field

This disclosure relates generally to automotive radar systems, and more specifically, to phase-modulated continuous-wave (PMCW) code-division multiplexing (CD) multiple-input-multiple-output (MIMO) radar systems.

Related Art

In non-MIMO (multiple-input-multiple-output) radar systems, identical waveforms are transmitted at all transmitter channels of the radar system, each with a different amount of phase shift applied for focusing the transmission waveforms on a desirable look direction in the far field. This is referred to as transmit beamforming using an antenna array. In MIMO radar systems, no transmit beamforming is attempted. Instead, each transmitter channel transmits with a broad radiation pattern to illuminate the entire field of view (FOV) of the radar. The transmitted waveforms are also not identical, but are orthogonal to each other in either time, frequency, code, or other domains. At the receiver, signals originated from individual transmitter channels are then separated and the separated signals are processed to extract targets' range, Doppler speed (i.e., radial velocity), and direction of arrival (DoA) information.

A MIMO radar system includes multiple transmitting and receiving elements that form a virtually large antenna array aperture for detecting targets in antennas' FOV. For any MIMO radar, the signals transmitted by different transmitter channels are distinctly spreadable at any receiver channel as individual signals such that the resulting antenna array has an effective aperture equal to the convolution of the transmitting antenna array with the receiving antenna array. For an example MIMO radar with N transmitting antennas and M receiving antennas, a total of N×M virtual receiving elements can be constructed out of the N+M physical antennas. Each virtual receive element is effectively located at a position vector that is the sum of a paired transmit element and receive element position vectors. As a result, a large antenna array can be virtually formed with fewer physical elements to achieve better angle resolution. This characteristic of MIMO radar is of great value to automotive radars, which demands good angular resolution performance under stringent size, weight, power, and cost constraints. As a result, MIMO radar systems are often used in automotive radar applications that require high angle resolutions, especially with the 76~81 GHz millimeter wave automotive radar systems.

BRIEF DESCRIPTION OF THE DRAWINGS

The present invention may be better understood, and its numerous objects, features, and advantages made apparent to those skilled in the art by referencing the accompanying drawings.

FIGS. 7A, 7B, and 7C are graphical representations of a ranging waveform encoded according to a Hadamard code set and processed by an example joint transmitter decoding and Doppler filtering process, according to some embodiments of the present disclosure.

FIGS. 9A, 9B, 9C, and 9D are graphical representations of ranging waveforms encoded according to multiple code sets for Doppler sidelobe level suppression, according to some embodiments of the present disclosure.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

Multiple techniques exist for separating radar transmitter signals at a radar receiver, which is the key requirement of MIMO (multiple-input-multiple-output) radar systems. A MIMO radar system includes multiple transmitters (or transmitter channels) and multiple receivers (or receiver channels). Typical techniques include time division multiplexing (TD), frequency division multiplexing (FD), and code division multiplexing (CD), among other MIMO techniques. In TD MIMO, only one transmitter transmits at any given time so receivers can separate transmitter signals simply by knowing the time of transmission of each transmitter. In FD MIMO, transmitters transmit simultaneously but each transmits on a different and non-overlapping frequency band so receivers can separate transmitter signals simply by knowing the transmission frequency band of each transmitter. In CD MIMO, the transmitter signals are arranged in distinct coded sequences and the codes are orthogonal to each other so receivers can separate distinct transmitter signals by decoding with the known transmitter codes. Because of the orthogonal nature of the codes, each decoder can output only the signal encoded with a matching code and signals encoded with other codes are suppressed. The TD MIMO technique suffers from lower hardware utilization because only one transmitter is working at any given time so it is less efficient from the hardware utilization point of view. The FD MIMO suffers from lower spectrum efficiency because it requires multiple times of frequency bands to operate so it is less efficient from the spectrum utilization point of view. Of the three MIMO techniques, CD MIMO does not have any of these inefficiency issues and is considered the most efficient, making it a highly sought after solution. However, the trade-off in implementing a CD MIMO technique involves more complicated transceiver design for the orthogonal coding and decoding processes.

Figure 1:
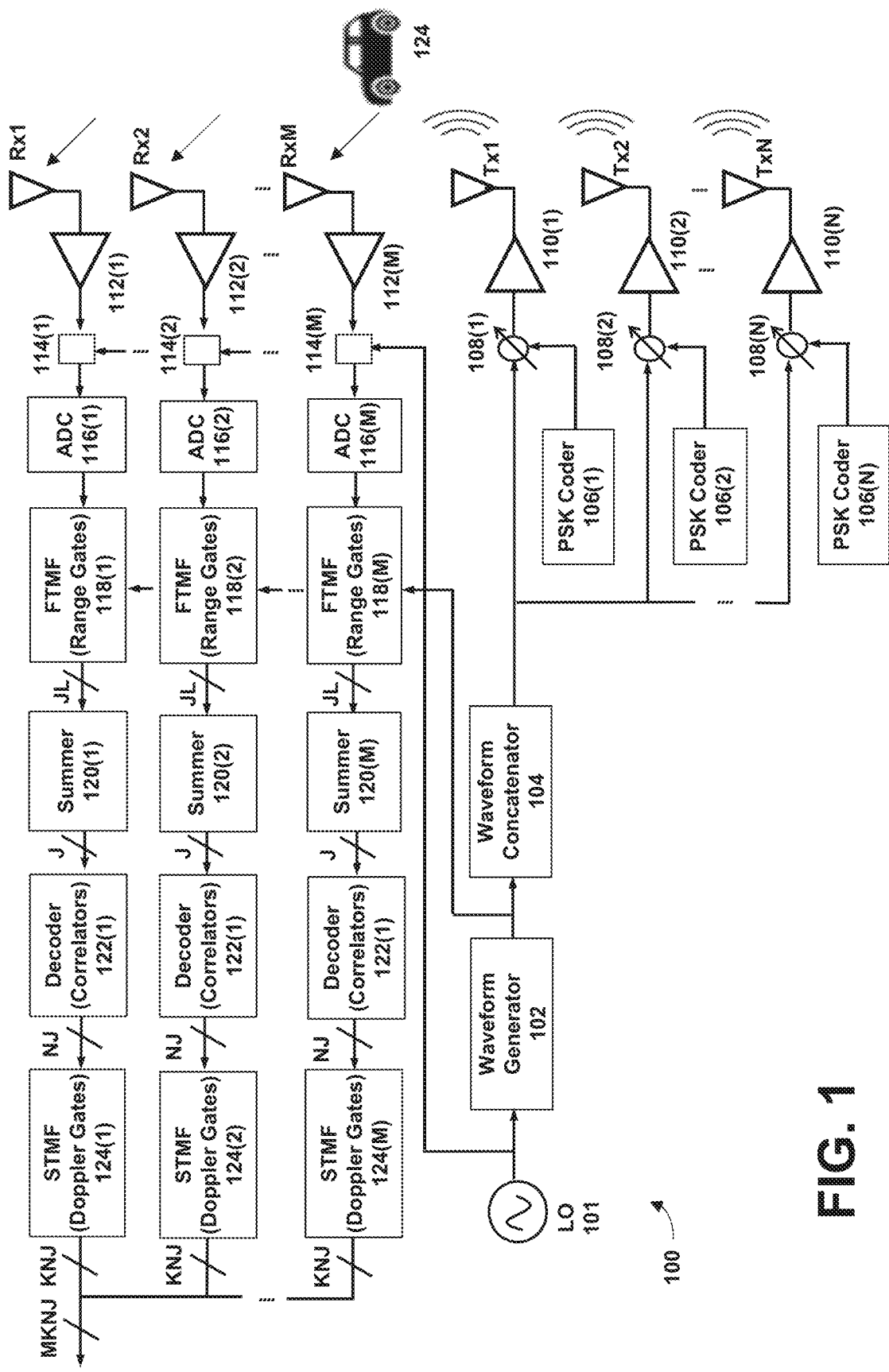
FIG. 1 is a block diagram depicting an example PMCW CD MIMO radar system implementing a conventional transmitter coding process, a conventional transmitter decoding process, and a conventional Doppler filtering process.

An example PMCW CD MIMO radar system 100 is shown in FIG. 1, which may implement a conventional transmitter coding and decoding scheme and a conventional Doppler filtering process, further discussed below. Radar system 100 includes a local oscillator (LO) 101, a waveform generator 102, a waveform concatenator 104, phase shift keying (PSK) coders 106(1)-(N), mixers 108(1)-(N), power amplifiers 110(1)-(N), and transmit antennas Tx1-TxN that implement an N number of transmitters (or transmitter channels). Radar system 100 also includes receive antennas Rx1-RxM, low noise amplifiers (LNA) 112(1)-(M), mixer blocks 114(1)-(M), analog-to-digital converters (ADC) 116(1)-(M), fast time matched filters (FTMF) 118(1)-(M), summer blocks 120(1)-(M), decoders 122(1)-(M), and slow time matched filters (STMF) 124(1)-(M) that implement an M number of receivers (or receiver channels). These components are further discussed in detail below. Radar system 100 may also be referred to as a transceiver 100 including N transmitters and M receivers. During operation, the N transmitters drive encoded output signals on transmit antennas Tx1-TxN, which backscatters off an object in the range of radar system 100, such as vehicle 124, and echo signals are received on receive antennas Rx1-RxM. Since the echo signals are delayed in time as compared with the transmitter output signals, the radar system 100 generates signals indicating the relationships between the echo signals and the transmitter output signals, which may be processed by a functional evaluation circuit and provided to digital signal processing to determine information about the object, also referred to herein as the target.

The conventional transmitter coding process generates the transmitter output signals by concatenating unit ranging waveforms into a ranging waveform block. A unit ranging waveform is a phase modulated signal whose phase varies as a function of time according to a predetermined phase shift pattern defined by an inner code. The inner code is a sequence of code chips, where each code chip has a value that corresponds to a phase shift, such as +1 for a phase shift of 0° and −1 for a phase shift of 180°. An L number of unit ranging waveforms are concatenated to form a ranging waveform block, and a sequence of an N' number of ranging waveform blocks are concatenated and phase-coded to form a transmitter waveform block (also referred to as a coded sequence). The N' ranging waveform blocks are phase-coded according to a predetermined phase shift pattern defined by an outer code, which is a sequence of N' code chips, also referred to as having a code length N'. Each outer code is part of a set of transmitter codes, where each transmitter code in the set is orthogonal to the other codes in the set, and the code length N' is no shorter than the N number of transmitters. Each of the N transmitters is assigned a respective transmitter code, with a total of N transmitter codes in the code set. Each transmitter transmits their respective coded sequence at the same time for a repeated number of times, such as K times, for facilitating Doppler estimation. The K repeated coded sequences forms the transmitter output signal, which is also referred to as a Doppler waveform block. In other words, an outer code phase-coded sequence of an inner code phase-coded PMCW ranging waveform sequence (with the outer code length approximating the number of transmitters) is repeated over time for facilitating Doppler estimation.

Assuming a unit waveform has a length of Tr [sec], each respective ranging waveform block has a length of L*Tr [sec], and each respective transmitter waveform block has a length of N'*L*Tr [sec]. The interval of the repeated transmission of each coded sequence is the pulse repetition interval or PRI, which is understood herein as the "transmitter waveform block repetition interval". The radar system of FIG. 1 can achieve a minimum PRI of N'*L*Tr, where the total transmission time of the Doppler waveform block including K repeated transmitter waveform blocks is K*NTh*Tr [sec]. The length of PRI must be greater or equal to the unit ranging waveform's duration Tr to accommodate transmitter idle time between unit waveforms in some systems. The repeated unit waveforms allow range measurements to be produced over the multiple PRIs. Due to the relative movement between the radar and the target, the stability of the local oscillator, and the stationarity of the propagation channel, there exists a finite time during which a target's echo signal can be extracted coherently from a range-Doppler gate detection cell and an unambiguous determination of the target's range and Doppler speed can be made. The maximum time an echo signal of the target can be coherently processed within a detection cell is referred to as the detection cell dwell time (Tdwell), or dwell time in short.

Generally, during the dwell time, each receiver receives echo signals of the transmitters' Doppler waveform blocks and processes the echo signal for information extraction. Each receiver includes FTMF 118, which implements J range gates that each include L inner code filters for sorting the echo signals received by a given receiver into J range bins according to time of arrival relative to the transmitted Doppler waveform blocks, where the different range bins correspond to different ranges in which the target may be located. Each receiver also includes a summer block 120 that sums up the J*L outputs for each J range gate, resulting in J range gate outputs. Each receiver also includes a decoder 122 that implements J sets of N correlators, where each of the J range gate outputs are provided to a respective set of N correlators. Each of the N correlators is associated with a respective transmitter code of the code set, and the echo signal is cross-correlated with each of the N transmitter codes. Each of the N correlators outputs a correlation signal that has a peak when the echo signal was (most likely) encoded with a transmitter code that matches the correlator's associated transmitter code. As a result, the echo signal with matching transmitter code is decoded, and other signals (such as noise signals or signals encoded with a different transmitter code) are suppressed. Each receiver further includes STMF 124, which implements K Doppler gates that sorts the decoded echo signals into a K number of Doppler bins according to Doppler frequency shift or offset relative to the transmitted Doppler waveform blocks, where the different Doppler bins correspond to different Doppler speeds at which the target may be traveling. The number of Doppler bins achievable by the radar system depends on the number of PRIs completed during the dwell time.

However, since the code length requirement for transmitter coding is dependent on the N number of transmitters in the radar system (and assuming dwell time on target is a fixed constraint), scaling up the N number of transmitters in a MIMO radar system consequently reduces the number of Doppler bins that can be constructed for transmitter decoding, which reduces the maximum unambiguous Doppler speed measurable by the system. In other words, the more transmitters that need to be encoded, the more limited the maximum speed the system can observe. In addition, because the transmitter decoding process assumes negligible Doppler effect within each encoded sequence, for the cases of fast moving targets or prolonged coded sequences, the phase rotation between unit waveforms in one coded sequence due to Doppler shift becomes non-negligible and degradations occur due to phase-mismatches in the decoding correlators. The mismatch effect lowers the decoder correlation peak and causes higher decoder correlation sidelobes, resulting in poor separation of transmitters that degrades the performance of constructed of MIMO virtual aperture.

The present invention provides a PMCW CD MIMO radar system that implements an optimized transmitter coding process and a joint transmitter decoding and Doppler filtering process, which overcomes the issues discussed above by first choosing a set of transmitter outer codes having a code length equal to the number of Doppler bins allowable by the dwell time, that are orthogonal to each other, and whose cross-correlations are less periodic in nature; and secondly by weighting the Doppler gates using the complex conjugates of the orthogonal outer codes. The resulting combination filters are simultaneously tunable to transmitter outer code and Doppler shifts, making the decoders dedicated to the sole task of transmitter decoding in a conventional radar system unnecessary. The selection of orthogonal and low-periodic cross-correlation code is an important step for ensuring unambiguous decoding outputs. Many orthogonal codes are highly periodic in their cross correlations and such codes should be avoided.

In addition, because the phase rotation effect between unit waveforms is accounted for in the joint transmitter decoding and Doppler filtering process, the phase-mismatch effect due to target movement is no longer a concern. As a result, when compared to conventional radar systems, the maximum unambiguous Doppler shift measurable by the system of present invention is extended by at least a factor equal to the number of transmitters. The decoder mismatches are also eliminated, resulting in better transmitter separation performance and thus better performance in constructed MIMO virtual apertures.

In other embodiments of the present disclosure, multiple sets of code are constructed and used across multiple measurement periods, where the measurements are tracked or integrated over the multiple measurement periods to enhance the dynamic range of the Doppler estimates.

Example Embodiments

Figure 2:
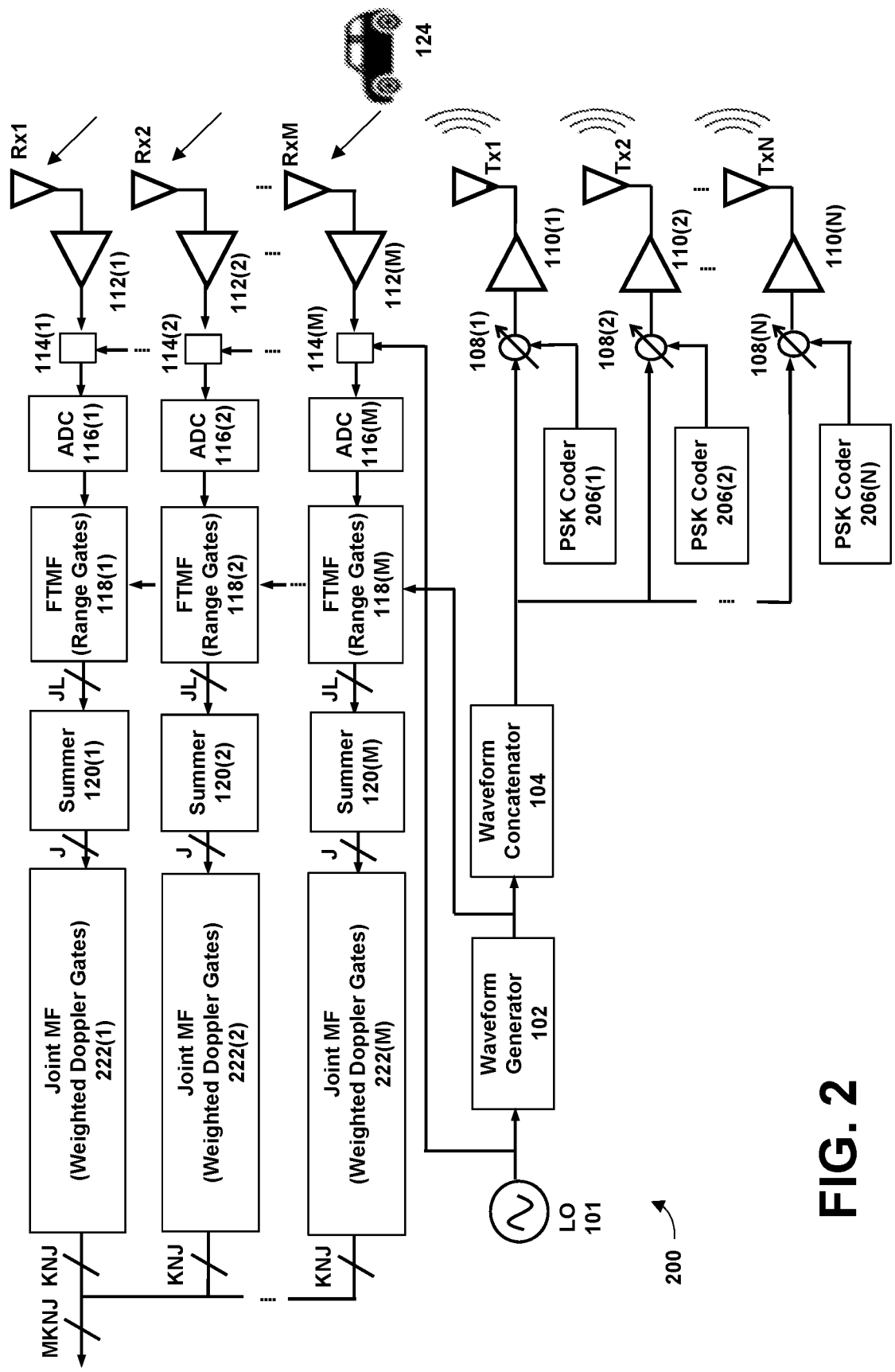
FIG. 2 is a block diagram depicting an example PMCW CD MIMO radar system implementing an optimized transmitter coding process, and a joint transmitter decoding and Doppler filtering process, according to some embodiments of the present disclosure.

FIG. 2 shows an example phase modulated continuous wave (PMCW) code division (CD) multiple-input-multiple-output (MIMO) radar system 200 that implements an optimized transmitter coding and decoding scheme that uses an optimized code set and a joint transmitter decoding and Doppler filtering process, as further discussed below. Radar system 200 includes a local oscillator (LO) 101, a waveform generator 102, a waveform concatenator 104, phase shift keying (PSK) coders 206(1)-(N), mixers 108(1)-(N), power amplifiers 110(1)-(N), and transmit antennas Tx1-TxN that implement N transmitters. Radar system 200 also includes receive antennas Rx1-RxM, low noise amplifiers 112(1)-(M), mixer blocks 114(1)-(M), analog-to-digital converters (ADC) 116(1)-(M), fast time matched filters (FTMF) 118(1)-(M), summer blocks 120(1)-(M), and joint transmitter decoding and Doppler filters 222(1)-(M) that implement M receivers. Radar system 200 may also be referred to as a radar transceiver 200 including N transmitters and M receivers. These components are further discussed in detail below. Elements having the same reference numbers in FIG. 1 and FIG. 2 indicate a same component that implements a same function. Transmitters and their associated transmit antennas may both be identified by TxN, such as Tx1 or Tx2. Receivers and their associated receive antennas may both be identified by RxM, such as Rx1 or Rx2. Also, it is noted that L, M, K, N, and J (used below) are integers greater than 1.

Figure 3A:
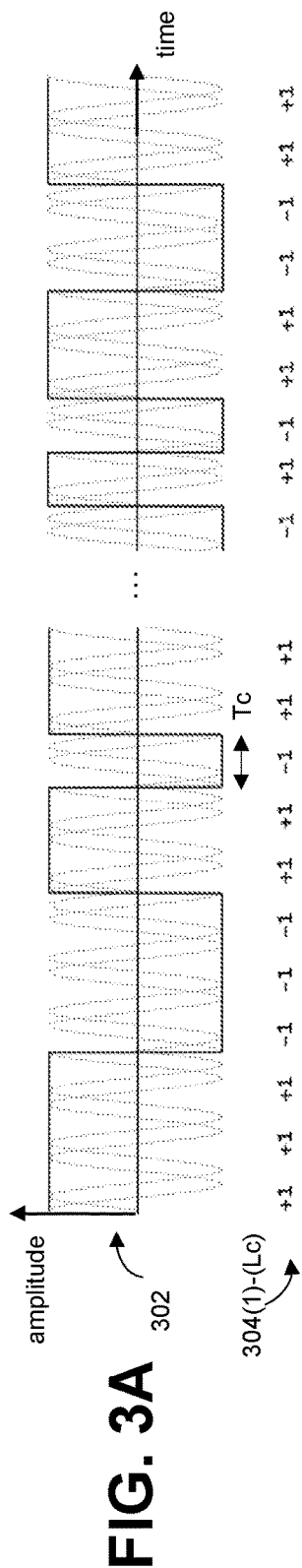
FIGS. 3A, 3B, and 3C show waveforms of example ranging waveforms in the amplitude domain according to a conventional code set.

In both FIG. 1 and FIG. 2, on the transmitter side, LO 101 generates a sinusoidal signal at a carrier frequency, which is provided to the waveform generator 102. The waveform generator 102 modulates the phase of the sinusoidal signal with a baseband waveform, which has a limited bandwidth in the spectral domain. The resulting waveform is referred to as a unit ranging waveform, an example of which is shown in an amplitude domain waveform in FIG. 3A. A unit ranging waveform 302 is a phase modulated (or phase-coded) signal whose phase varies as a function of time according to a predetermined phase shift pattern defined by an inner code 304. The inner code 304 is a sequence of code chips, where the number of chips of the inner code is referred to as Lc, which are labeled as 304(1)-(Lc). Each code chip has a value that corresponds to a phase shift, such as +1 for a phase shift of 0° and −1 for a phase shift of 180°, where the duration of each possible phase shift is referred to as an inner code chip duration Tc. For example, a Barker code sequence may be used as the inner code. A 13-chip Baker code sequence contains 13 chips, or [+1 +1 +1 +1 +1−1 −1 +1 +1−1 +1−1 +1]. This type of code has only two phase-shift values so it is referred to as a binary phase shift keying (BPSK) code. Popular types of BPSK inner codes used in PMCW CD-MIMO radars include the Maximum Length Sequence (also known as the m-sequence) and the Almost Perfect Autocorrelation Sequence (APAS). These codes are popular because of their superior cyclic autocorrelation property, which is necessary for achieving good ranging performance with continuous-wave (CW) radar systems. In the example shown in FIG. 3A, unit ranging waveform 302 is phase-coded using a 31-chip m-sequence inner code of [+1 +1 +1−1 −1−1 +1 +1−1 +1 +1 +1−1 +1−1 +1−1 −1−1 −1 +1−1 −1 +1−1 +1 +1−1 −1 +1 +1].

Figure 3B:
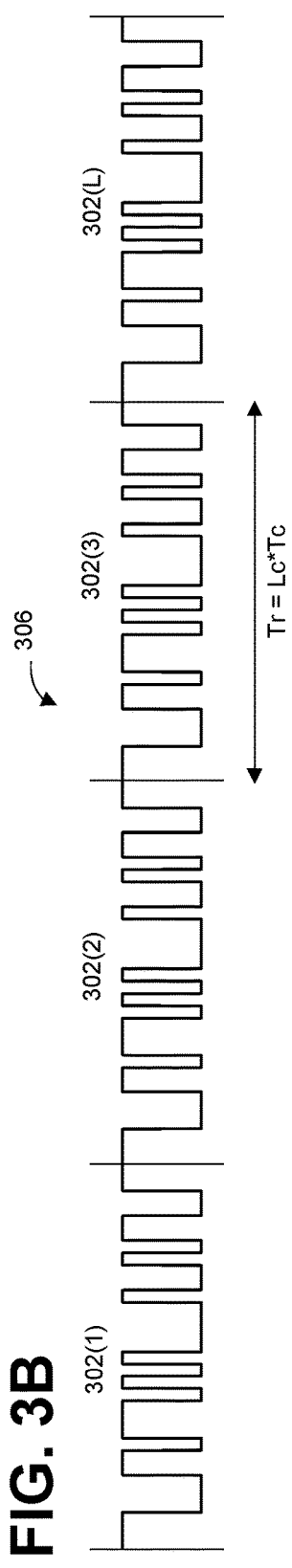

In both FIG. 1 and FIG. 2, the waveform generator 102 outputs a stream of unit ranging waveforms to waveform concatenator 104, which concatenates an L number of unit ranging waveforms to form a ranging waveform block, shown in FIG. 3B. Each of the unit ranging waveforms 302(1)-(L) have a length Tr [sec] equal to the number of inner code chips Lc times the inner code chip duration Tc (or Tr=Lc*Tc), resulting in ranging waveform block 306 having a length of L*Tr [sec]. Waveform concatenator 104 outputs a stream of ranging waveform blocks 306.

In both FIG. 1 and FIG. 2, each of the N transmitters has a phase shift keying (PSK) coder that is configured to implement a code set of preselected orthogonal transmitter code, also referred to as outer code. The PSK coders 106 in FIG. 1 use a conventional transmitter code set having code length N', and the PSK coders 206 in FIG. 2 use an optimized transmitter code set having code length K, which are further discussed below under the heading Transmitter Coding. The ranging waveform blocks 306 output by waveform concatenator 104 are encoded in accordance with the respective code set at mixer 108, and the resulting RF waveform is referred to as a coded sequence (CS) or transmitter waveform block.

Figure 3C:
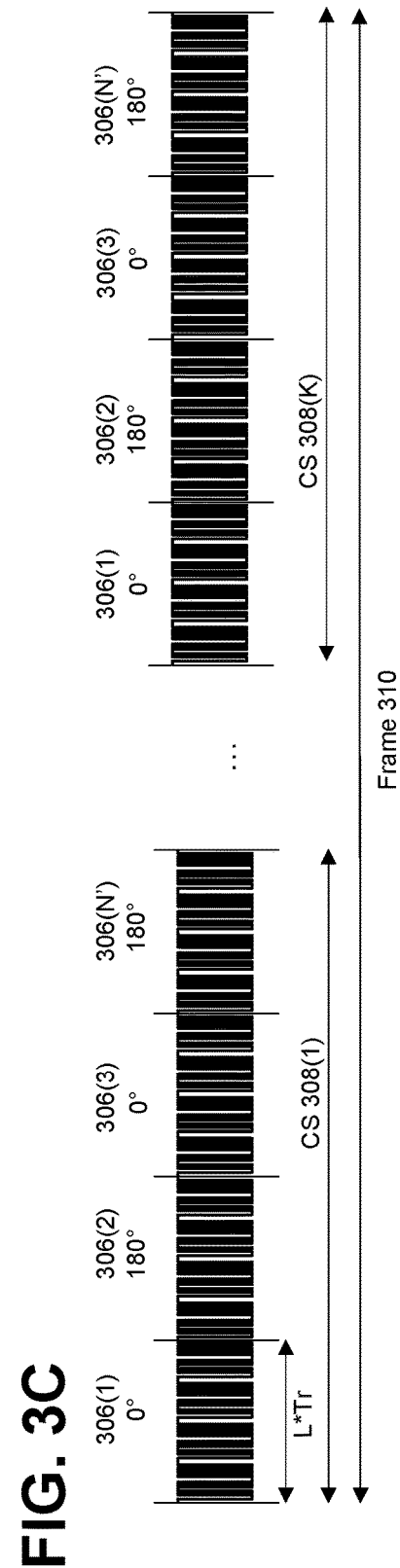

PSK coders 106 in FIG. 1 are configured to encode a CS having N' ranging waveform blocks using conventional transmitter (or outer) code, where CS is repeated K times to produce a Doppler waveform block, shown in FIG. 3C. Each of the ranging waveform blocks 306(1)-(N') has a length L*Tr [sec], resulting in CS 308 (or transmitter waveform block 308) having a length N'L*Tr. CS 308 is repeated K times to form a slow-time (Doppler) measurement frame 310 or Doppler waveform block 310, which has a duration equal to K*N'*Th*Tr.

Figure 4:
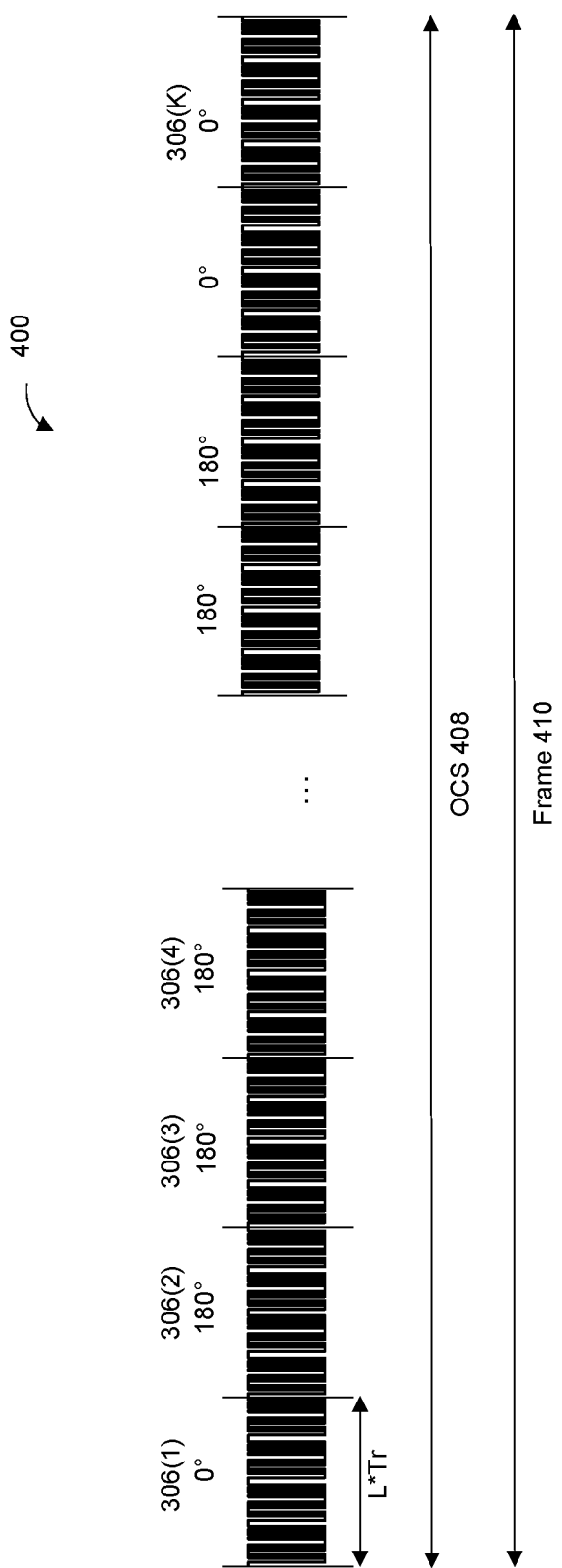
FIG. 4 shows a waveform of an example ranging waveform in the amplitude domain according to an optimized code set, according to some embodiments of the present disclosure.

PSK coders 206 in FIG. 2 are configured to encode an optimized CS using optimized transmitter (or outer) code, as shown in FIG. 4. The Doppler waveform block 410 (or slow-time Doppler measurement frame 410) is formed by a single optimized CS (OCS) 408 having K ranging waveform blocks 306. The appropriate Doppler waveform block (the K repeated CS in FIG. 1, or the optimized CS in FIG. 2) is provided to PA 110, which drives the Doppler waveform block on the corresponding transmit antenna Tx. Each transmitter is associated with a respective Doppler waveform block, which are transmitted simultaneously (illustrated as concentric waves coming off of the transmit antennas), illuminating the targets in the FOV of the radar system, such as vehicle 124. The echo signals (or reflected Doppler waveform blocks) from a target in the radar system's FOV then arrive at all receivers and are processed, as discussed below.

In both FIG. 1 and FIG. 2, for each of the M receivers, an echo signal is received on a respective receive antenna Rx (shown as an arrow received at the receive antennas, which may have bounced off of the vehicle 124) and is passed through LNA 112. The echo signal is then downmixed by block 114. In some embodiments, block 114 includes a mixer that downmixes the echo signal with the output of the LO 101 (e.g., uses the carrier frequency to downmix the echo signal to baseband or uses a different frequency to downmix the echo signal to an intermediate frequency (IF) domain). In some embodiments, block 114 also includes a low-pass filter.

The downmixed echo signal is then sampled by ADC 116, which outputs a digital signal. It is noted that the echo signal may take various forms after being processed by each functional block of the receiver, but the various forms are still referred to herein as the "echo signal" because each form continues to correspond to the echo signal. The echo signal includes the transmitter (outer) code used to encode the ranging waveform blocks of the original Doppler waveform block that originated the echo signal.

Each receiver also includes a fast time matched filter (FTMF) 118 that receives samples of the echo signals from the ADC 116 output and samples of a unit ranging waveform provided by waveform generator 102, and detects the target's range. Each FTMF 118 basically implements a bank of J range gates, each J range gate implemented by L inner code filters, or J groups of L filters (where L is the number of concatenated unit ranging waveforms implemented in a ranging waveform block). Each J group is tuned to a distinct time delay, or range bin, which corresponds to a range of interest. Each L filter in a J group may be implemented by a correlator configured to multiply a sample of the echo signal with a respective complex-conjugate copy of a sample of the unit ranging waveform block with amount of delay corresponding to a range gate. Each correlator provides an output signal that corresponds to the likelihood of the target being located in one of the ranges of interest. Because the sequence of N' ranging waveform blocks (or the transmitted Doppler waveform block) is formed from multiple unit ranging waveforms, multiple correlation results are expected. The output signal is maximized at the correlator that has the amount of time delay matched to a target's distance. Output signals of other correlators whose delays are not matched are suppressed. As a result, each FTMF 118 has a J*L number of outputs. The J groups of L filters act as J range gates that sort the echo signals into the various range bins. In some embodiments, each correlator is implemented using time-domain filtering. In other embodiments, each correlator is implemented using frequency-domain filtering, which is more efficient. The natural resolution of the estimated range corresponds to one over the waveform bandwidth and the maximum measurable unambiguous range is proportional to the length of the waveform. The range resolution is C*Tc/2 (where C is speed of light), which is proportional to the inverse of the ranging waveform's bandwidth (which is 2/Tc from null to null [Hz]). The maximum unambiguous range that is measurable from a single ranging waveform block is capped by Tr*C/2 [m].

In FIG. 1, the J*L outputs of each FTMF 118 are provided to a respective summer block 120 in each receiver. Because multiple correlation results are expected, a final estimate is obtained from integrating the L output signals in each of the J groups. It is noted that since the outer code is overlaid on top of the sequence of N' ranging waveform blocks, a phase transition often occurs between two ranging waveform blocks and the first unit ranging waveform of each ranging waveform block may be corrupted by a phase discontinuity caused by the phase transition of the outer code. As a result, the first unit ranging waveforms are usually discarded, indicating that the minimum number of L (which is the number of concatenated unit ranging waveforms in a ranging waveform block) should be 2. As a result, summer block 120 is configured to sum the 2nd to Lth outputs for each J group, resulting in each summer block 120 having a J number of outputs corresponding to J range bins, also referred to J range gate outputs. In some embodiments, the value of L is set to 1 purposely by neglecting the potential degradation caused by the phase discontinuity caused by the aforementioned outer-code transition. This is usually not preferred, but under some circumstances it may be done out of necessity due to resource constraints.

In FIG. 1, the J outputs of each summer block 120 are provided to a respective decoder 122 in each receiver to decode the outer code of the echo signals. Each decoder 122 includes J sets of N correlators, one set for each of the J range gate outputs. In each set, each of the N correlators is associated with a respective conventional transmitter (outer) code having length N' (which is no smaller than N). Each of the N correlators is configured to cross-correlate an echo signal with the correlator's associated transmitter code to detect whether the echo signal includes the associated transmitter code, effectively checking the echo signal against every transmitter code used for coding at the N transmitters. Since the transmitted sequences of N' ranging waveform blocks were phase shifted according to a distinct transmitter outer code at each respective transmitter, each J range gate output (which is derived from an echo signal originated from the transmitted sequence of N' ranging waveform blocks) is equivalently phase shifted according to each of the N transmitter outer codes. Decoder 122 correlates each of the J range gate outputs with a respective one of the N transmitter outer codes, producing N outputs for each J range gate output, or N*J outputs. Each correlator outputs a correlation signal that indicates a scaled probability that the correlator's associated transmitter code is detected in the echo signal (e.g., indicates a scaled probability that the ranging waveform blocks of the echo signal were encoded with the associated transmitter code). The correlation signal includes a peak greater than a detection threshold when the echo signal's transmitter code matches the correlator's associated transmitter code, while the correlation signal remains below the detection threshold for non-matches. Because of the orthogonal nature of the transmitter codes, each decoder 122 only outputs a correlation signal associated with the echo signal including the matching transmitter code, while other signals are suppressed.

Further in FIG. 1, the N*J outputs of each decoder 122 are provided to a respective slow time matched filter (STMF) 124 in each receiver. It is noted that at any given range gate output of FTMF 118, if a target is present, a phase rotation corresponding to the radial velocity of the reflecting target will be present in the filter's outputs. Hence, the spectral domain information observed from multiple PRIs (usually referred to as the slow time domain) contains the target's radial velocity information. Each STMF 124 implements a bank of K filters, each of the K filters tuned to a distinct Doppler shift of the carrier frequency reflected by the target, which are used for extracting the target's radial velocity information. For example, each STMF 124 usually include a bank of K Fast Fourier transform (FFT) filters that act as Doppler gates that sort the echo signals into various Doppler bins. The Doppler shift measured from the slow-time domain processing has a measurable unambiguous frequency ranging between $-0.5/PRI$ and $+0.5/PRI$ [Hz], where PRI is equal to N'*L*Tr. Translated to radial velocity, the measurable unambiguous radial velocity ranges between $-0.5*C/(PRI*fc)$ and $+0.5*C/(PRI*fc)$ [m/s], where C is the speed of light and fc is the carrier frequency. The resolution of the Doppler measurement is determined by the number of PRI's transmitted and it is equal to $1/(K*PRI)$ [Hz] (or equivalently $1/(K*N'Tr)$ [Hz]) where K is the number of PRIs. Translated to radial velocity, it has a resolution of $C/(K*PRI*fc)$ [m/s] (or equivalently $C/(K*N'Tr*fc)$ [m/s]). Each STMF 124 has a K*N*J number of outputs, where a total number of M*K*N*J outputs are produced over the M receivers.

Figure 11:
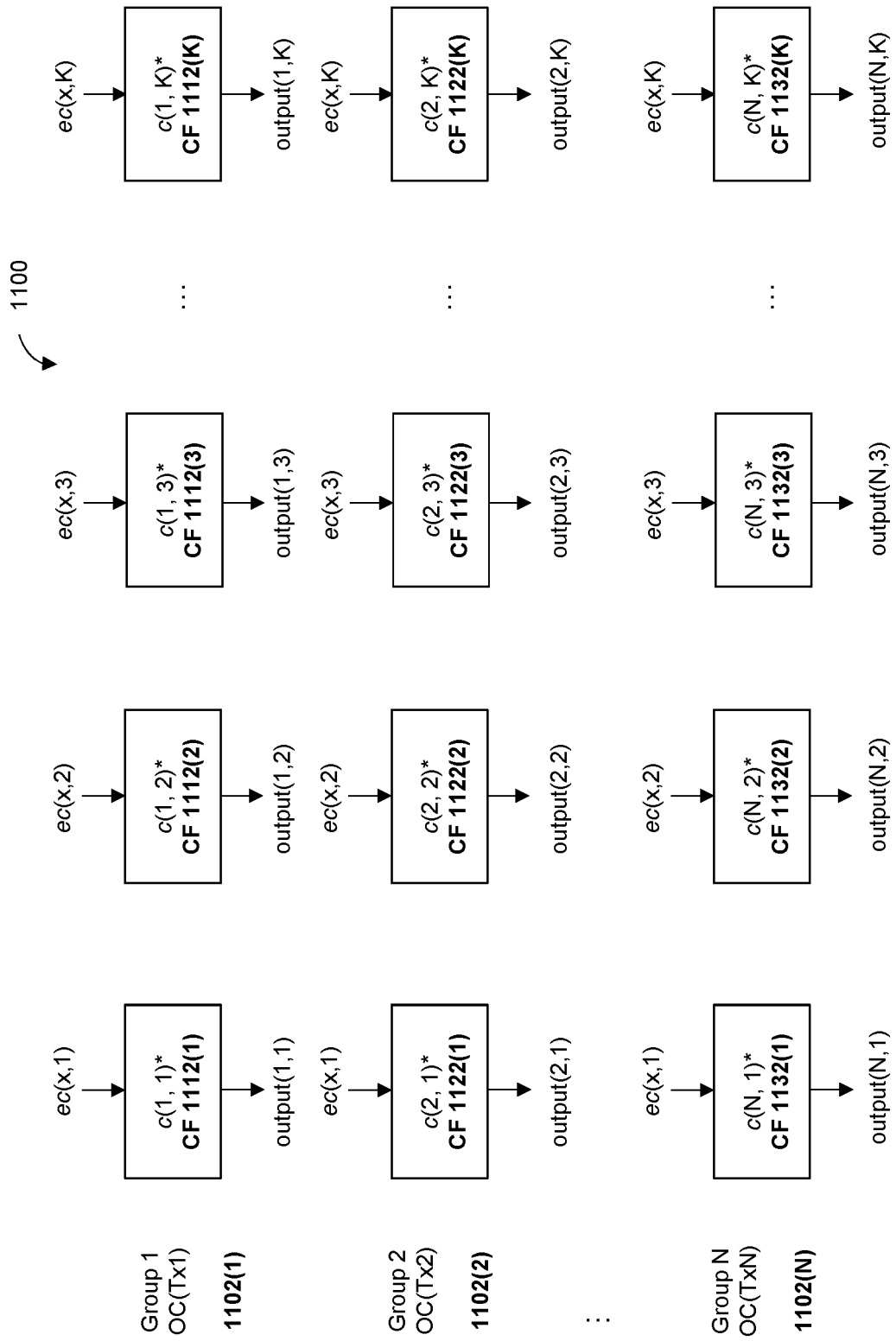
FIG. 11 is a block diagram depicting an example joint matched filter used for joint transmitter decoding and Doppler filtering in the radar system of FIG. 2, according to some embodiments of the present disclosure.

By contrast, FIG. 2 does not have decoders 122(1)-(M) and STMF 124(1)-(M), but the receivers instead include joint matched filter (MF) 222(1)-(M) that implement the joint transmitter decoding and Doppler filtering process. Picking up at summer block 120 output on the receiver end, the J outputs of each summer block 120 are provided to a respective joint MF 222, where each joint MF 222 includes a bank of K*N combination filters for each J range bin output. FIG. 11 shows an example joint matched filter 222 that includes a bank 1100 of K*N combination filters for a J range gate output, where the bank 1100 is repeated for each J range gate output. The combination filters may be grouped into an N number of groups 1102 that correspond to the N transmitters, where each group includes K combination filters (CF), such as group 1102(1) including CF 1112(1)-(K), group 1102(2) including CF 1122(1)-(K), and group 1102(N) including CF 1132(1)-(K). Each of the K combination filters in a given group (also referred to as Doppler filters) are tuned to a distinct Doppler shift of the carrier frequency reflected by the target, acting as Doppler gates configured to sort the echo signals into a K number of Doppler bins according to differing Doppler shifts. The K*N combination filters may be implemented by a bank of K*N FFT filters, each tuned to a distinct Doppler shift of the carrier frequency reflected by the target.

Simultaneously, the echo signals may be decoded by the K*N combination filters. Each of the N groups of combination filters is also associated with a respective optimized transmitter (outer) code having length K (shown as OC(Tx1) for transmitter Tx1's optimized transmitter code, OC(Tx2) for transmitter Tx2's optimized transmitter code, and OC(TxN) for transmitter TxN's optimized transmitter code), where the optimized transmitter code is a sequence of K code chips. Each of the N groups includes K combination filters, where each of the K combination filters is associated with a respective code chip of the associated optimized transmitter code (e.g., a one-to-one correspondence between the K combination filters and the K code chips). Each of the K*N combination filters are weighted using the complex conjugate of the associated code chip (e.g., $c(1,1)^*$, where the asterisk * indicates the complex conjugate of the code chip), where a code chip of the echo signal is multiplied by the complex conjugate of the associated code chip (e.g., $ec(x,1)$, where x indicates the transmitter code used to encode the echo signal's original coded sequence is as yet unknown), as further discussed below.

A complex conjugate of a complex number has a real part equal to the complex number's real part, and an imaginary part equal in magnitude to the complex number's imaginary part but opposite in sign (e.g., $x+iy$ has complex conjugate $x-iy$). Multiplying a code chip with the complex conjugate of the same code chip results in a non-negative real number, which can be used to provide a large correlation signal that indicates the code chip of the echo signal matches the combination filter's associated code chip. Each of the K*N combination filters output a correlation signal (e.g., output (1,1) as shown) that has a peak when the echo signal's code chip is multiplied by the complex conjugate of a matching code chip (e.g., a portion of the echo signal was (most likely) encoded with a transmitter code chip that matches the combination filter's associated transmitter code chip). Within each group, the combination of correlation signals by the K combination filters (e.g., the sum of all outputs (1,1)-(1,K) for the first group) provides a peak greater than a detection threshold when the echo signal's transmitter code matches the associated optimized transmitter code (or when the entirety of the sequence of code chips included in the echo signal matches the sequence of K code chips checked by the K combination filters), while non-matches remain below the detection threshold. As such, the N groups of K combination filters are configured to cross-correlate an echo signal with the associated optimized transmitter codes, effectively checking the echo signal against every transmitter code used for coding at the N transmitters.

As a result, each joint MF 222 is simultaneously tunable to optimized transmitter codes and Doppler shifts, without requiring a dedicated decoder. The Doppler shift measured from the slow-time domain processing has a measurable unambiguous frequency ranging between $-0.5/PRI$ and $+0.5/PRI$ [Hz], where PRI is equal to L*Tr. A maximum unambiguous Doppler shift of $1/(L*Tr)$ [Hz] detected by the system, which corresponds to an improvement factor of N' achieved by the system (as compared to the conventional system achieving a maximum of $1/(N'L*Tr)$ [Hz]). Translated to radial velocity, the measurable unambiguous radial velocity ranges between $-0.5*C/(PRI*fc)$ and $+0.5*C/(PRI*fc)$ [m/s], where C is the speed of light and fc is the carrier frequency. The resolution of the Doppler measurement is determined by the number of PRI's transmitted and it is equal to $1/(K*PRI)$ [Hz] (or equivalently $1/(K*L*Tr)$ [Hz]) where K is the number of PRIs. Translated to radial velocity, it has a resolution of $C/(K*PRI*fc)$ [m/s] (or equivalently $C/(K*Tr*fc)$ [m/s]). Each joint MF 222 has a $K*N*J$ number of outputs, for a total number of $M*K*N*J$ outputs produced over the M receivers.

The optimized transmitter codes are further discussed under the heading Transmitter Coding, and the joint decoding and Doppler filtering process implemented by joint MF 222(1)-(M) is further discussed under the heading Transmitter Decoding and Doppler Filtering. Information regarding the target may be obtained by evaluating the $M*K*N*J$ outputs, as further discussed below in connection with FIG. 10.

Figure 10:
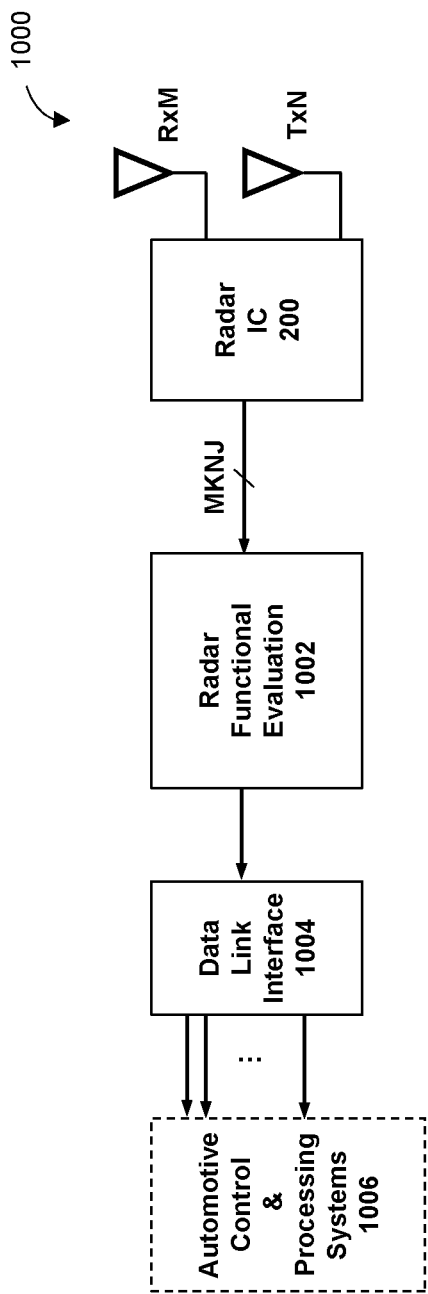
FIG. 10 is a block diagram depicting an example automotive system in which the radar system of FIG. 2 may be implemented, according to some embodiments of the present disclosure.

FIG. 10 shows an example automotive system 1000 in which radar system 200 may be implemented, such as on a vehicle. In the embodiment shown, the radar system 200 may be implemented as an integrated circuit (IC), labeled radar IC 200, which may be formed as part of a semiconductor die or semiconductor substrate located within a vehicle. Radar IC 200 may be attached to an underlying carrier substrate such as a microcontroller board or PCB to form part of a radar device, where the carrier substrate includes electrically conductive features on a non-conductive substrate, formed using polyimide or FR4 or BT resin. The radar IC 200 includes the transceiver (e.g., transmitter and receiver) components discussed above in connection with FIG. 2. While the radar IC 200 is connected to the transmit antennas Tx1-TxN and receive antennas Rx1-RxM through transmission lines, the transmit antennas Tx1-TxN and receive antennas Rx1-RxM may be formed as part of the radar integrated circuit, or may be formed as a separate integrated circuit (e.g., as part of a radar sensor) and attached to the microcontroller board, or may be formed as a separate device (e.g., as part of a radar sensor) and attached to an exterior of the vehicle (e.g., to provide 360 degree coverage around the vehicle).

Automotive system 1000 also includes radar functional evaluation circuit 1002 configured to receive and process the outputs of radar transceiver 200 to detect the presence of a target and estimate the target's azimuth, or elevation angles, or both. The radar functional evaluation circuit 1002 may also be configured to extract the target range, Doppler speed (or radial velocity), and direction of arrival (DoA) information. The results are tracked to further reduce noise and then classified. For example, radar functional evaluation circuit 1002 may include functional blocks such as a detector, a DoA estimator, a tracker, and a classifier. The resulting list of detected targets in the range, radial velocity, and angle space, which is sometimes referred to as target plots, are then tracked (e.g., via Kalman filter based trackers) for further reducing detection errors and for condensing and clustering the information and classified to identify the types of targets. Radar functional evaluation circuit 1002 may also be formed separately and attached to the microcontroller board.

The extracted target information (and optionally intermediate data, or the raw digitized signal samples, or both) is then sent to the data link interface 1004 that is connected to other automotive control and processing systems 1006 that may be located elsewhere in the vehicle, away from the microcontroller board. Examples of systems 1006 include but are not limited to sensor fusion, control, and processing systems for safety monitoring, driver assistance, autonomous driving applications, and other applications. Typical data link interfaces include the Mobile Industry Processor Interface (MIPI), the Controller Area Network (CAN) bus, standard Local Area Network (LAN) interfaces, and Serializer-Deserializer (SerDes) interfaces and optical fiber links.

Radar functional evaluation circuit 1002 may provide warning indications about the tracked objects to the automotive control and processing systems 1006 through the data link interface 1004. For example, an automotive processor may in turn communicate warnings about the tracked objects to the driver of the vehicle through visual displays, audio warning or chimes, and driver assistance (e.g., decelerating the vehicle or altering the course of the vehicle).

Transmitter Coding

To better illustrate the differences between using the conventional code set and the optimized code set, operation of PSK coders 106(1)-(N) of FIG. 1 is discussed herein.

In FIG. 1, PSK coders 106(1)-(N) are each configured to implement a conventional code set having a code length N' no shorter than the N number of transmit signals to be encoded (e.g., the minimum code length is equal to N), where the code length equals the number of code chips present in each transmitter code of the code set. The ranging waveform block 306 is repeated an N' number of times, where the N' ranging waveform blocks are encoded in accordance with the N' code chips of the conventional code set at mixer 108, and the resulting waveform is referred to as coded sequence (CS) 308 (e.g., the number of ranging waveform blocks 306 in CS 308 is equal to the code length N'). This coded sequence 308 constitutes a single observation in the slow-time domain. Typical transmitter coding schemes are based on M-phase shift keying (M-PSK) technique (where M in M-PSK is unrelated to the M number of receivers), in which the integer value of M determines number of phase shift positions used for encoding the ranging waveform blocks. For the case of M equal 2, it is referred to as the binary-phase shift keying (BPSK) in which two phase shift positions, 0° and 180° (which are represented in phasor format as +1 and −1, respectively), are used for encoding transmitter waveforms. For example, to encode 4 transmitter waveforms, the following set of code based on length-N' (where N' equals 4) Hadamard code are commonly used.

$C_1 = [c_{1,1} c_{1,2} c_{1,3} c_{1,4}] = [+1+1+1+1]$ $C_2 = [c_{2,1} c_{2,2} c_{2,3} c_{2,4}] = [+1-1+1-1]$ $C_3 = [c_{3,1} c_{3,2} c_{3,3} c_{3,4}] = [+1+1-1-1]$ $C_4 = [c_{4,1} c_{4,2} c_{4,3} c_{4,4}] = [+1-1-1+1]$

Each transmitter code (for example, $C_1$) includes a sequence of 4 code chips (for example, c1,1, c1,2, c1,3, and c1,4) used for phase-modulating the ranging waveform blocks, where each transmitter code chip sequence is used for a respective transmitter, up to a maximum of 4 transmitters. For example, FIG. 3 illustrates an example coded sequence CS for transmitter Tx2, which is associated with the second transmitter code $C_2$. Referring to the second transmitter code $C_2$ above, the code chip c2,1, which is of the value of +1 in above example, means that a phase shift of 0° is applied to the first ranging waveform block 306(1) of transmitter Tx2 (i.e., no phase shift applied). The code chip c2,2, which is of the value of −1, means that a phase shift of 180° is applied to the second ranging waveform block 306(2) of transmitter Tx2. CS 308 is also repeated over time, such as K times, for facilitating Doppler estimation. As shown in FIG. 3, each CS 308 includes a repeating pattern of N' ranging waveform blocks encoded according to the appropriate transmitter code chip sequence, where CS 308 is repeated for K times to form a slow-time (Doppler) measurement frame 310, which has a duration equal to K*N'*L*Tr [sec] that is less than or equal to the detection cell dwell time (Tdwell).

By contrast, in FIG. 2, PSK coders 206(1)-(N) are each configured to implement an optimized coding scheme that uses an orthogonal transmitter code set that meets a selection or optimization criteria (listed below) and has a code length (or number of code chips) equal to the length of the Doppler filter (i.e., the number of Doppler filtering samples). For example, if a total of K ranging waveform blocks can be transmitted for estimating the Doppler shift of targets according to a maximum dwell time, the code length should be selected such that it is as close to K as possible, but no greater than K.

Each transmitter is assigned a distinct transmitter code from the optimized transmitter code set, which is implemented at the respective PSK coder 206 (components of the transmitter, such as the transmit antenna Tx or PSK coder may also be referred to as being assigned the distinct transmitter code). The distinct transmitter codes in the optimized transmitter code set must meet the following selection or optimization criteria:
1) Any transmitter code is orthogonal to any other transmitter code in a selected code set; and
2) The Fourier transform (e.g., the spectral analysis) of the cross-correlation between any two transmitter codes in a selected code set results in sidelobes no greater than a predetermined detection threshold.

The optimization criterion 1 ensures minimum leakage in the MIMO decoding process when transmitter signals are separated at the receivers. The optimization criterion 2 ensures a sufficient dynamic range for Doppler estimates which allows the detection of weak target (small radar cross section or RCS) in the presence of strong (large RCS) targets in the same range gate. The echo signal (which includes one of the optimized transmitter codes) is cross-correlated with each of the N optimized transmitter codes. Spectral analysis (such as a discrete Fourier transform) decomposes these cross-correlation signals into their component frequencies, referred to as a frequency response or spectrum, which is the frequency domain representation of the signal. The frequency spectrum includes a number of Doppler bins that are spaced apart by some frequency resolution (which is dependent on the sampling frequency implemented at the ADC 116), and each Doppler bin is associated with a frequency component magnitude. The frequency components of the cross-correlated signals are sorted into the Doppler bins, but some frequency components may not cleanly fall into a single Doppler bin, instead falling between two Doppler bins. Since the frequency response is discrete, the energy from the frequency component "leaks" out to any surrounding Doppler bins, appearing as sidelobes. The second criterion provides that such sidelobes are distinguishable from the main lobe to ensure transmitter separation by the sidelobes having a value no greater than the predetermined detection threshold, where the main lobe has a much larger value. For example, the predetermined detection threshold may be the square root of the code length (or $\sqrt{K}$), where a correlation signal having a (decoded) magnitude that is equal to or less than $\sqrt{K}$ may itself not be a detected peak. This $\sqrt{K}$ threshold value is based on summing over K received ranging waveform blocks correlated with a mismatched coded sequence. Because the two coded sequences are not matched, the sum of the cross correlation accumulates in a non-coherent fashion, leading to a mean magnitude of $\sqrt{K}$. On the other hand, when a transmitter code of an echo signal is cross-correlated with a matching transmitter code, the sum of the cross correlation accumulates in a coherent fashion, leading to a magnitude of K, which is higher than $\sqrt{K}$. Note that the conventional near-far problem of code-division multiple access (CDMA) systems does not apply in this situation because the targets of question are at the same distance from the radar.

Some popular orthogonal codes commonly used for MIMO transmitter coding, such as the Hadamard code, are perfectly orthogonal and will satisfy the first optimization criterion. But unfortunately, they fail the second criterion because severe sidelobes are present in the Fourier domain of their cross-correlations. Hence not all orthogonal codes are suitable for the present invention and careful selections of the joint transmitter and Doppler code is of paramount importance. The selection of orthogonal and low-periodic cross-correlation code is an important step for ensuring unambiguous decoding outputs. Many orthogonal codes are highly periodic in their cross-correlations and such codes should be avoided.

As shown in FIG. 4, the ranging waveform block 306 is repeated a K number of times and phase shifted according to a length-K BPSK transmitter code. There is only one transmitter code chip sequence that is never repeated for the entire slow-time measurement frame within the dwell time. As shown in FIG. 4, ranging waveform blocks 306 are encoded in accordance with the length-K code set at mixer 108, and the resulting waveform is referred to as an optimized coded sequence (OCS) 408. The ranging waveform blocks 306 are encoded using an optimized transmitter code having code length K, such as [+1−1 −1−1 . . . −1−1+1+1], where +1 code chips translate to a phase shift of 0 degrees applied to a respective ranging waveform block and −1 code chips translate to a phase shift of 180 degrees applied to a respective ranging waveform block. In other words, the number of ranging waveform blocks 306 in OCS 408 is equal to the code length K. The K number of ranging waveform blocks form a slow-time (Doppler) measurement frame 410 (also referred to as Doppler frame 410) having a duration of K*L*Tr [sec], which is less than or equal to the dwell time. In this example, a single OCS 408 including a K number of ranging waveform blocks 306 forms frame 410 (e.g., OCS 408 is not repeated during the frame 410), where a K number of PRIs are completed during the frame 410, where the PRI is equal to L*Tr. For contrast, FIG. 3 shows a conventional CS 308 including an N' number of ranging waveform blocks (such as 4 blocks), where CS 308 is repeated a K number of times to form a frame 310 having a duration of K*N'*L*Tr, which completes a K number of PRIs during the frame 310, where the PRI is equal to NTh*Tr (such as 4*L*Tr).

An example code set OC of optimized orthogonal transmitter code having code length K (where in this example K=128) that meets the optimization criteria is provided below, and is used in the Decoding Examples below. While 1s have been omitted, the plus sign ("+") indicates a code chip that applies a 0 degree phase shift and the minus sign ("−") indicates a code chip that applies a 180 degree phase shift:

$OC_1 = \begin{bmatrix} c_{1,1} & c_{1,2} & c_{1,3} & c_{1,4} \ldots c_{1,K} \end{bmatrix} = [+ - + - - - + + + - - - + + + +$
$+ + + - + + + - + + + - - + + + \ldots +$
$- - + - + - - - + + - - + - + - + + + + + - + - - + + -$
$- \ldots -$
$- + - + + + + - + - + + - + - - - - + - - - - + - + + - -$
$- \ldots -$
$- - + + + - + - - + + - - + - + - + + - - + + - + + - + - - +]$ $OC_2 = \begin{bmatrix} c_{2,1} & c_{2,2} & c_{2,3} & c_{2,4} \ldots c_{2,K} \end{bmatrix} = [+ + + + + + + + + + + + - - + -$
$+ + + - - - - + - - + - + + + - \ldots - -$
$-$
$- + + + - + + - + + + - + + + + + - + - - + - - - + - +$
$\ldots +$
$- + - + + - - - + + + - - + - + - + - + - + - - + - + - -$
$+ \ldots +$
$+ - + + + - + + + + - + - + + + + + - + + - - - + - + - + - -]$ $OC_3 = \begin{bmatrix} c_{3,1} & c_{3,2} & c_{3,3} & c_{3,4} \ldots c_{3,K} \end{bmatrix} = [- + - + + + + - + - + + -$
$+ + + + - - + - + - + - + + - + - + -$
$\ldots +$
$+ - + + + - + - - + + - + - + - + - + - + + + - - + + - +$
$+ \ldots +$
$+ + + + - + + - + - - + + + + - + + - - - - + - - - - + -$
$- \ldots -$
$+ - + + - + + - + - + + + - - - + + - + - - + + - - - + -$
$-]$ Transmitter Decoding and Doppler Filtering To better illustrate the differences between using the conventional decoding and the joint decoding and Doppler filtering, operation of FTMF 118(1)-(M), decoders 122(1)-(M), and STMF 124(1)-(M) of FIG. 1 are discussed herein.

In FIG. 1, at any given range gate output of FTMF 118, if a target is present, a phase rotation corresponding to the radial velocity of the reflecting target will be present in the filter's outputs. The signals from the N transmit antennas across the four code chips present the same relative phase relationship, as prescribed by the conventional transmitter code. The spectral domain information observed from multiple PRIs (usually referred to as the slow time domain) contains the target's radial velocity information, which is extracted by decoder 122. For example, assuming at the m-th receiver, at the j-th range gate's output of FTMF 118 (where m=1 . . . M and j=1 . . . J), a target has a complex amplitude A(n,m,j) if the waveform is not coded and only the n-th transmitter is transmitting (n=1 . . . N), the range gate's outputs from all transmitters at the receiver is:

$x \equiv x_1 + x_2 + x_3 + x_4 = [A_{1,m,j} + A_{2,m,j} + A_{3,m,j} + A_{4,m,j},$
$A_{1,m,j} - A_{2,m,j} + A_{3,m,j} - A_{4,m,j}, \ldots \ldots A_{1,m,j} + A_{2,m,j} - A_{3,m,j} - A_{4,m,j},$
$A_{1,m,j} - A_{2,m,j} - A_{3,m,j} + A_{4,m,j}] = [x_1 \quad x_2 \quad x_3 \quad x_4]$ where:

$x_1 = [A_{1,m,j}c_{1,3}A_{1,m,j}c_{1,2}A_{1,m,j}c_{1,3}A_{1,m,j}c_{1,4}] = [A_{1,m,j} \\ A_{1,m,j}A_{1,m,j}A_{1,m,j}]$ $x_2 = [A_{2,m,j}c_{2,1}A_{2,m,j}c_{2,2}A_{2,m,j}c_{2,3}A_{2,m,j}c_{2,4}] = [A_{2,m,j} - \\ A_{2,m,j}A_{2,m,j} - A_{2,m,j}]$ $x_3 = [A_{3,m,j}c_{3,1}A_{3,m,j}c_{3,2}A_{3,m,j}c_{3,3}A_{3,m,j}c_{3,4}] = [A_{3,m,j} \\ A_{3,m,j} - A_{3,m,j} - A_{3,m,j}]$ $x_4 = [A_{4,m,j}c_{4,1}A_{4,m,j}c_{4,2}A_{4,m,j}c_{4,3}A_{4,m,j}c_{4,4}] = [A_{4,m,j} - \\ A_{4,m,j} - A_{4,m,j}A_{4,m,j}]$

The target amplitude originated from the n-th transmitter is then extracted by conducting element-by-element multiplication of the code chip outputs with the complex conjugate of the corresponding transmitter code and then accumulated to obtain a summed output. For example, to extract the 4-th transmitter Tx4 target amplitude, decoder 122 performs the following computation:

$$\hat{A}_{4,m,j} = [x_1 \quad x_2 \quad x_3 \quad x_4] * conj\left\{\begin{bmatrix} +1 \\ -1 \\ -1 \\ +1 \end{bmatrix}\right\} = 4A_{4,m,j}$$

As shown in above example, the output from the multiply-and-accumulate operation extracts the correct target amplitude with an additional processing gain equal to the code length. The above example represents the output of the decoder 122 of the j-th range gate for one coded sequence, where decoder 122 has NJ outputs. As mentioned earlier, to measure Doppler shift, multiple code sequences must be transmitted and the outputs are collected and processed. FIG. 3 illustrates an example of a conventional coded ranging waveform block sequence 308 (based on the second $C_2$ Hadamard code of the above example), which is repeated for K times to form a slow-time (Doppler) measurement frame 310.

Further, denote $\hat{A}_n[k]$ as the decoded target amplitude corresponding to the n-th transmitter's signal at the j-th range gate for the k-th coded sequence or slow-time sample, where k=1 . . . K. The Doppler shift of the target at the range gate illuminated by the n-th transmitter is then obtained by STMF 124 performing discrete Fourier transform (DFT) on the sample sequence $\hat{A}_n = [\hat{A}_n[1], \hat{A}_n[2], \ldots \hat{A}_n[K]]$. To extract a target signal at a Doppler shift value $f_D$ [Hz], the following DFT filtering computation is performed:

$$y_{n,m,j}(f_D) = \sum_{k=1}^{K} \hat{A}_n[k] e^{-j2\pi f_D (k-1) PRI} \text{ (note that } j = \sqrt{-1}, j \neq j)$$

In theory, the above DFT filtering can be conducted for arbitrary Doppler shift of interest. In practice, the bank of DFT filters is implemented using Fast Fourier Transform (FFT) for higher computation efficiency. The K FFT outputs of STMF 124 are denoted as $y_{n,m,j} = [y_{n,m,j,1}, y_{n,m,j,2}, \ldots y_{n,m,j,K}]$ in which $y_{n,m,j,k}$ is denoted as the k-th FFT or the k-th Doppler gate output, which corresponds to the output of a DFT filter tuned to a Doppler shift of $$f_{D,k} = \frac{k-1}{K*PRI}$$

The above $y_{n,m,j,k}$ denotes the m-th receiver's target amplitude matched filtered to the j-th range gate and the k-th Doppler gate and is illuminated by the n-th transmitter.

As noted above, the maximum time a target can be coherently processed within a detection cell is referred to as the detection cell dwell time ($T_{dwell}$), or dwell time in short. Because of the constraint of the fixed dwell time on the target, the requirement for transmitter coding consequently reduces the number of Doppler bins that can be constructed, which reduces the maximum unambiguous Doppler speed measurable by the system. For example, assuming a dwell time of 30 ms, for a 30μ-sec ranging waveform block (i.e., L*Tr=30e-6), up to 1000 (i.e. K=1000) ranging waveform blocks can be shared among the tasks of transmitter coding and Doppler estimation. For comparison, in the non-MIMO case, in which N is 1, minimum PRI is equal to the ranging waveform block length. The resulting maximum measurable unambiguous Doppler shift is ±16.6 KHz, or (assuming a carrier frequency of 78 GHz) equivalently a maximum measurable unambiguous radial velocity of ±64 m/s or ±230 km/hr, which is suitable for highway traffic. For the case of a MIMO radar, assuming there are 3 transmitters, typically 4 ranging waveform blocks will need to be allocated for transmitter coding. As a result, the maximum measurable unambiguous radial velocity is reduced by 4 times to ±57 km/hr. The reduction becomes more severe as more transmitters need to be coded. For example, for the case of 16 transmitters, the maximum measurable unambiguous radial velocity is reduced by 16 times to ±14 km/hr, which is limited for road use. The situation is worsened for system with high range resolution. The example of 30 ms dwell time assumes a range resolution of 1 m and a maximum radial speed of 120 km/hr. If the range resolution is 0.1 m, the dwell time is reduced to 3 ms and the maximum Doppler can be measured becomes ±1.4 km/hr and its usefulness is severely limited.

In addition, because the conventional transmitter decoding process assumes negligible Doppler effect within each encoded sequence, for the cases of fast moving targets or prolonged coded sequences, the phase rotation effect due to Doppler shift becomes non-negligible and degradations occur due to phase-mismatches in the decoding correlators. The mismatch effect lowers the decoder correlation peak and causes higher decoder correlation sidelobes, resulting in poor separation of transmitters which degrades the performance of constructed of MIMO virtual aperture.

Continuing the above example, $A_{n,m,j}$ is denoted as the complex target amplitude at the j-th range gate's output received by the m-th receiver from the illumination of the n-th transmitter, assuming there is no relative movement between the radar and the target, without any outer coding applied. Conventionally, a 4×4 Hadamard code may be used for encoding the ranging waveform block sequences of the transmitter, which is reproduced below:

$C_1=[c_{1,1}c_{1,2}c_{1,3}c_{1,4}]=[+1+1+1+1]$ $C_2=[c_{2,1}c_{2,2}c_{2,3}c_{2,4}]=[+1-1+1-1]$ $C_3=[c_{3,1}c_{3,2}c_{3,3}c_{3,4}]=[+1+1-1-1]$ $C_4=[c_{4,1}c_{4,2}c_{4,3}c_{4,4}]=[+1-1-1+1]$

The received outer coded sequences at a receiver's j-th range gate output is (assuming no relative movement between the radar and target), which is also reproduced below:

$$x_1=[A_{1,m,j}+A_{2,m,j}+A_{3,m,j}+A_{4,m,j}, A_{1,m,j}-A_{2,m,j}+A_{3,m,j}-A_{4,m,j}, \ldots A_{1,m,j}+A_{2,m,j}+A_{3,m,j}+A_{4,m,j}, A_{1,m,j}-A_{2,m,j}-A_{3,m,j}+A_{4,m,j}]$$

If the radial velocity is not zero (i.e., there is relative movement between radar and target), the received outer coded sequence at range gate output becomes:

$$x(m) \cong [A_{1,m,j}+A_{2,m,j}+A_{3,m,j}+A_{4,m,j} \ldots A_{1,m,j}e^{j2\pi f_D L T_r} - A_{2,m,j}e^{j2\pi f_D L T_r} + A_{3,m,j}e^{j2\pi f_D L T_r} - A_{4,m,j}e^{j2\pi f_D L T_r}, \ldots$$
$$A_{1,m,j}e^{j4\pi f_D L T_r} + A_{2,m,j}e^{j4\pi f_D L T_r} - A_{3,m,j}e^{j4\pi f_D L T_r} - A_{4,m,j}e^{j4\pi f_D L T_r}, \ldots A_{1,m,j}e^{j6\pi f_D L T_r} - A_{2,m,j}e^{j6\pi f_D L T_r} - A_{3,m,j}e^{j6\pi f_D L T_r} + A_{4,m,j}e^{j6\pi f_D L T_r}]$$

where:

$$f_D = \frac{-2v_R * f_c}{C}$$

$v_R$ is the radial velocity in [m/s], and
$f_c$ is the carrier frequency in [Hz] and C is the speed of light in [m/s], assuming the differences between the Doppler shift between n–m transmitter-receiver pairs are negligible.

To extract the target amplitude of the first transmitter Tx1, the decoder 120 performs the following computation:

$$\hat{A}_{1,m,j} = [x] * conj\left\{\begin{bmatrix}+1\\+1\\+1\\+1\end{bmatrix}\right\} =$$

$$(A_{1,m,j} + A_{2,m,j} + A_{3,m,j} + A_{4,m,j}) * 1 + \ldots (A_{1,m,j}e^{j2\pi f_D LTr} - A_{2,m,j}e^{j2\pi f_D LTr} + A_{3,m,j}e^{j2\pi f_D LTr} - A_{4,m,j}e^{j2\pi f_D LTr}) * 1 +$$
$$\ldots (A_{1,m,j}e^{j4\pi f_D LTr} + A_{2,m,j}e^{j4\pi f_D LTr} - A_{3,m,j}e^{j4\pi f_D LTr} - A_{4,m,j}e^{j4\pi f_D LTr}) * + \ldots (A_{1,m,j}e^{j6\pi f_D LTr} - A_{2,m,j}e^{j6\pi f_D LTr} - A_{3,m,j}e^{j6\pi f_D LTr} + A_{4,m,j}e^{j6\pi f_D LTr}) * 1 =$$
$$A_{1,m,j}(1 + e^{j2\pi f_D LTr} + e^{j4\pi f_D LTr} + e^{j6\pi f_D LTr}) +$$
$$\ldots A_{2,m,j}(1 - e^{j2\pi f_D LTr} + e^{j4\pi f_D LTr} - e^{j6\pi f_D LTr}) +$$
$$\ldots A_{3,m,j}(1 + e^{j2\pi f_D LTr} - e^{j4\pi f_D LTr} - e^{j6\pi f_D LTr}) +$$
$$\ldots A_{4,m,j}(1 - e^{j2\pi f_D LTr} - e^{j4\pi f_D LTr} + e^{j6\pi f_D LTr})$$

$$\begin{cases} = 4A_{1,m,j} & \text{if } f_D = 0 \text{ or } \mod(2\pi f_D LTr, 2\pi) = 0 \\ \cong 4A_{1,m,j} & \text{if } 2\pi f_D(N'-1)LTr \cong 0 \\ \neq 4A_{1,m,j} & \text{if else} \end{cases}$$

Using the above target amplitude computation for Tx1 for comparison, we can see that decoding the 4-th transmitter Tx4 will only be ideal if only the $A_{4,m,j}$ term remains and the rest of the $A_{1,m,j}$, $A_{2,m,j}$, and $A_{3,m,j}$ terms are zeros. We can also see that the ideal extraction will not be possible without $f_D=0$ or $\mod(f_D Tr, 2\pi)=0$ in general. As a result, for any moving target scene, the conventional decoding process cannot separate transmitter signals perfectly, resulting in leakage in the decoder outputs. As successful MIMO aperture construction requires separation of the transmitters' signals, the leakage results in degradation in the formed virtual aperture. The effect of such degradation is also random and worsens with increased relative speed of the targets. In practice, to ensure tolerable mismatching for the entire PRI, the outer code length and ranging waveform block duration are constrained (i.e. making sure $2\pi f_D$ (N'−1)LTr≅0 such that $e^{j2\pi f_D LTr}$, $e^{j4\pi f_D LTr}$, and $e^{j6\pi f_D LTr} \cong 1$).

To address these problems, the present disclosure provides an optimized transmitter decoding process combined with the Doppler measurement process to resolve the reduced maximum unambiguous Doppler speed and decoder phase-mismatch problem in a moving scene. The joint transmitter decoding and Doppler filtering process of the present disclosure chooses a set of optimized transmitter outer codes that are orthogonal to each other and whose cross correlations are less periodic in nature, with a code length equal to the number of Doppler bins allowable by the dwell time (which were discussed above under the header Transmitter Coding). The combination Doppler filters are weighted using the complex conjugates of the orthogonal outer codes, making the combination filters simultaneously tunable to transmitter outer codes and Doppler shifts, which eliminates the need for decoders dedicated to the sole task of transmitter decoding.

In addition, because the phase rotation effect is accounted for in the joint transmitter decoding and Doppler filtering process, the mismatch effect due to target movement is no longer a concern. As a result, comparing to conventional coding and decoding schemes, the maximum unambiguous Doppler shift measurable by the system of present invention is extended by at least a factor equal to the number of transmitters and the decoder phase-mismatches are also eliminated, resulting in better transmitter separation performance and thus better performance in constructed MIMO virtual apertures.

Continuing the discussion with the aforementioned example in which each PRI includes 4 ranging waveform blocks that are coded with the conventional length-4 Hadamard code and repeated for K PRIs, denote x(m, k) as the m-th receiver's j-th range gate's output for the k-th PRI, which contains the range gate's output for the four ranging waveform blocks of the k-th PRI. Assume in this case only 3 transmitters are transmitting, considering target's Doppler shift, x(m, k) can be written in the following expression:

$$x(m, k) = [x_1, x_2, x_3, x_4] = [(A_{1,m,j} + A_{2,m,j} + A_{3,m,j})e^{j2\pi f_D LTr},$$
$$\ldots (A_{1,m,j} - A_{2,m,j} + A_{3,m,j})e^{j2\pi f_D LTr},$$
$$\ldots (A_{1,m,j} + A_{2,m,j} - A_{3,m,j})e^{j4\pi f_D LTr},$$
$$\ldots (A_{1,m,j} - A_{2,m,j} - A_{3,m,j})e^{j6\pi f_D LTr}] * e^{j2\pi f_d(k-1)N'LTr}$$

In conventional decoding schemes, the received coded sequences x(m, k) are first decoded by decoders 122, and then the outputs are Fourier transformed by STMF 124 to obtain the Doppler estimates. For example, decode each x(m, k) using transmitter Tx1's code, the decoder output for the k-th PRI is $$\hat{A}_{1,m,j} = [k] = [x(m, k)] * conj\left\{\begin{bmatrix} +1 \\ +1 \\ +1 \\ +1 \end{bmatrix}\right\} =$$

$$(A_{1,m,j}(1 + e^{j2\pi f_D LTr} + e^{j4\pi f_D LTr} + e^{j6\pi f_D LTr}) +$$
$$\ldots A_{2,m,j}(1 - e^{j2\pi f_D LTr} + e^{j4\pi f_D LTr} - e^{j6\pi f_D LTr}) + \ldots$$

-continued
$$A_{3,m,j}(1 + e^{j2\pi f_D LTr} - e^{j4\pi f_D LTr} - e^{j6\pi f_D LTr})) * e^{j2\pi f_D(k-1)N'LTr}$$

(for k = 1 ... K)

A discrete Doppler filter or gate that is matched to a Doppler shift $f_d$ [Hz] is computed based on the following expression:

$$\hat{y}_{1,m,j}(f_d) = \sum_{k=1}^{K} \hat{A}_{1,m,j}[k]e^{-j2\pi f_d(k-1)PRI} =$$

$$\sum_{k=1}^{K} \hat{A}_{1,m,j}[k]e^{-j2\pi f_d(k-1)N'LTr} = \sum_{k=1}^{K} e^{j2\pi f_D(k-1)N'LTr} *$$

$$e^{-j2\pi f_d(k-1)N'LTr} * \{A_{1,m,j}(1 + e^{j2\pi f_D LTr} + e^{j4\pi f_D LTr} + e^{j6\pi f_D LTr}) +$$

$$A_{2,m,j}(1 - e^{j2\pi f_D LTr} + e^{j4\pi f_D LTr} - e^{j6\pi f_D LTr}) +$$

$$A_{3,m,j}(1 + e^{j2\pi f_D LTr} - e^{j4\pi f_D LTr} - e^{j6\pi f_D LTr})\}$$

By observing the above equation, it is can be seen that when $f_d = f_D$ (i.e., the Doppler filter's center frequency matches the target's actual Doppler frequency), the product of the first two terms is 1, because $$e^{j2\pi f_D(k-1)N'LTr} * e^{-j2\pi f_D(k-1)N'LTr} = e^0 = 1.$$

If $f_D$ is sufficiently small such that $$e^{j2\pi f_D LTr} \cong 1, e^{j4\pi f_D LTr} \cong 1, e^{j6\pi f_D LTr} \cong 1.$$

are true, the matched DFT Doppler filter's output is maximized at K, because $$\hat{y}_{1,m,j} = \Sigma_{k=1}^{K} 1 = K.$$

In the present disclosure, the optimized transmitter decoding and Doppler filtering are jointly performed. Let x(m, k) denote the m-th receiver's j-th range gate's output for the k-th PRI, which contains the range gate's output for a single ranging waveform block of the k-th PRI. The x(m,k) for the case of 3 transmitters can be written as (for k=1 . . . K):

$$x(m,k) = (A_{1,m,j}c_{1,k} + A_{2,m,j}c_{2,k} + A_{3,m,j}c_{3,k}) * e^{j2\pi f_D(k-1)N'LTr}$$

with the optimized code set denoted below for the 3 transmitters:

$$OC_1 = [c_{1,1}c_{1,2} \ldots c_{1,K}]$$

$$OC_2 = [c_{2,1}c_{2,2} \ldots c_{2,K}]$$

$$OC_3 = [c_{3,1}c_{3,2} \ldots c_{3,K}]$$

and when the codes are orthogonal to each other, then the following is true:

$$\sum_{k=1}^{K} c_{n',k} c_{n,k}^* = \begin{cases} K & \text{if } n' = n \\ \cong 0 & \text{if } n' \neq n \end{cases}$$

The joint transmitter decoding and Doppler filtering process is then conducted based on the following cross-correlation operations that 1) cross-correlate an echo signal with the N optimized transmitter outer codes (or N sequences of K code chips) used to encode the echo signal and 2) is weighted with the complex conjugate of the corresponding code chip of the optimized transmitter code (as indicated by the asterisk "*"), for decoding for an n-th transmitter and filtering for a Doppler shift of $f_d$ [Hz]:

$$\hat{y}_{n,m,j}(f_d) =$$

$$\sum_{k=1}^{K} x(m,k)(c_{n,k})^* e^{-j2\pi f_d(k-1)PRI} = \sum_{k=1}^{K} x(m,k)(c_{n,k})^* e^{-j2\pi f_d(k-1)N'LTr} =$$

$$\sum_{k=1}^{K} e^{j2\pi f_D(k-1)N'LTr} * e^{-j2\pi f_d(k-1)N'LTr} *$$

$$(A_{1,m,j} c_{1,k} c_{n,k}^* + A_{2,m,j} c_{2,k} c_{n,k}^* + A_{3,m,j} c_{3,k} c_{n,k}^*) =$$

$$A_{1,m,j} \sum_{k=1}^{K} c_{1,k} c_{n,k}^* e^{j2\pi (f_D - f_d)(k-1)N'Tr} +$$

$$A_{2,m,j} \sum_{k=1}^{K} c_{2,k} c_{n,k}^* e^{j2\pi (f_D - f_d)(k-1)N'LTr} +$$

$$A_{3,m,j} \sum_{k=1}^{K} c_{3,k} c_{n,k}^* e^{j2\pi (f_D - f_d)(k-1)N'LTr}$$

Based on the expression above, it can be seen that when a combination filter is tuned to the correct Doppler frequency (i.e. $f_d = f_D$)

$$\hat{y}_{n,m,j}(f_d) =$$

$$A_{1,m,j} \sum_{k=1}^{K} c_{1,k} c_{n,k}^* + A_{2,m,j} \sum_{k=1}^{K} c_{2,k} c_{n,k}^* + A_{3,m,j} \sum_{k=1}^{K} c_{3,k} c_{n,k}^* = KA_{n,m,j}$$

the combination filter's output is maximized at $KA_{n,m,j}$. In other words, when the echo signal includes the optimized transmitter code that matches the transmitter code of the n-th transmitter, the combination filters output a maximum value or peak due to being weighted with the complex conjugates of the optimized transmitter code chips (where multiplication of a code chip and its complex conjugate results in a non-negative real number useful for generating large correlation peaks), effectively decoding the echo signal and determining the spectral peak simultaneously, assuming that the combination filter is tuned to the target's Doppler frequency.

When the combination filter is not tuned to the target's Doppler frequency, the outputs may not be zeros and the level of the residual depends on the periodicity of the codes' cross correlation, denoted as $$\rho_{n',n}[k] = c_{n',k} c_{n,k}^*$$

If $\rho_{n',n}[k]$ has a periodicity matching with the combination filter's $f_D - f_d$ frequency, a large response will result. Because of this, it is important to find a set of code that has low cross-correlation periodicity.

For completeness' sake, returning to FIG. 10, the DoA estimator block included in radar functional evaluation circuit 1002 may use the target amplitude for determining DoA estimation. For simplicity, further denote $y_{i,j,k}$ as the target amplitude corresponding to the i-th virtual receive element matched filtered to the j-th range gate and the k-th Doppler gate, where the i-th virtual receive element is mapped to an n-th transmitter and m-th receiver pair according to the MIMO principle where $n \in \{1 \ldots N\}$, $m \in \{1 \ldots M\}$, and $i \in \{1 \ldots NM\}$. The DoA estimation is then conducted for the j-th range and k-th Doppler gate output (assuming it is with a magnitude above a detection threshold, such as a Constant False-Alarm Rate or CFAR threshold) by processing the virtual array signals $y_{i,j,k}$ (where $i=1 \ldots N*M$) using standard deterministic or statistical beamforming approaches or other higher-resolution approach such as Multiple Signal Classification (MUSIC) and Estimation of Signal Parameters via Rotational Invariance Technique (ESPRIT).

It is also noted that the data refresh rate (e.g., at a DoA estimation block) for the conventional coding and decoding scheme discussed above in connection with FIG. 1 is equal to 1/(N'Tr*K) [Hz]. By contrast, the data refresh rate for the optimized coding and decoding scheme discussed above in connection with FIG. 2 is equal to 1/(Tr*K) [Hz].

Decoding Examples

Figure 5A:
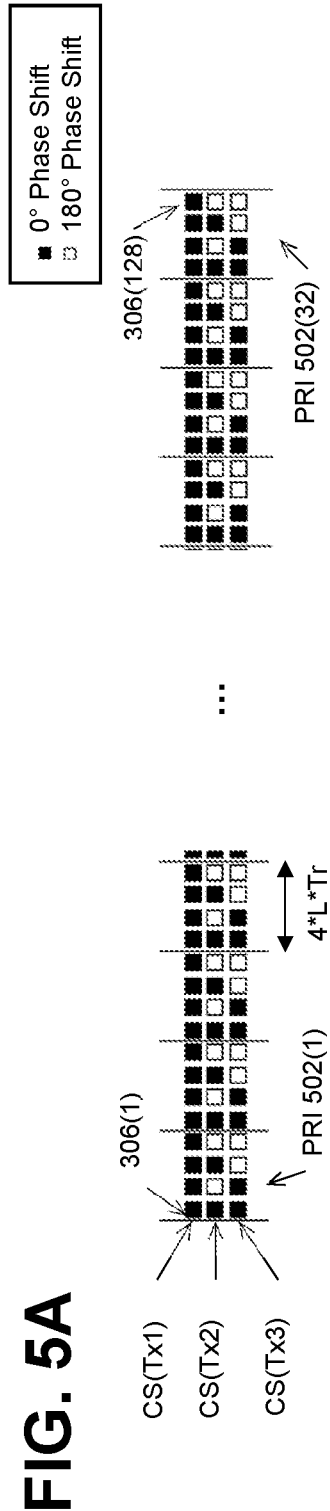
FIGS. 5A, 5B, and 5C are graphical representations of a ranging waveform encoded according to a conventional code set and processed by a conventional transmitter decoding process and a conventional Doppler filtering process.
Figure 5B:
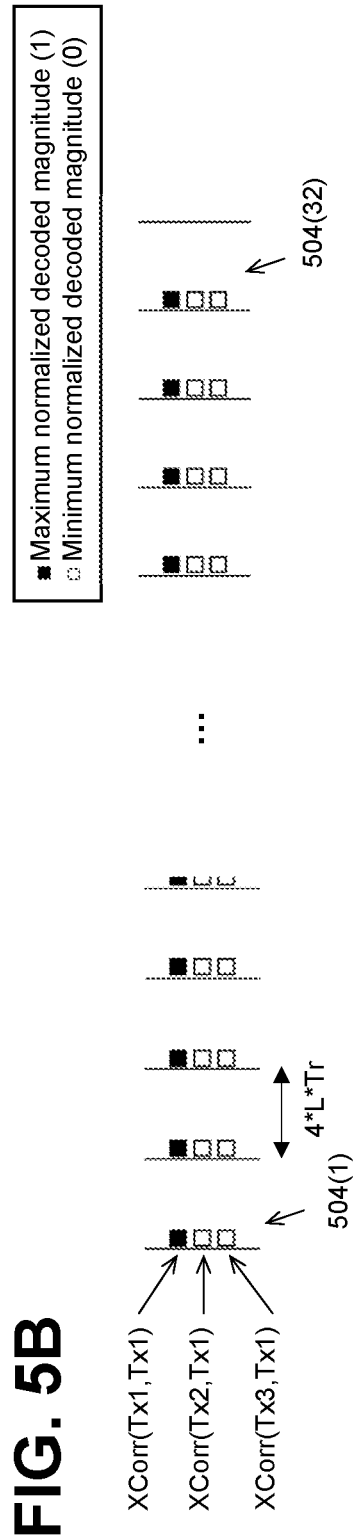
Figure 5C:
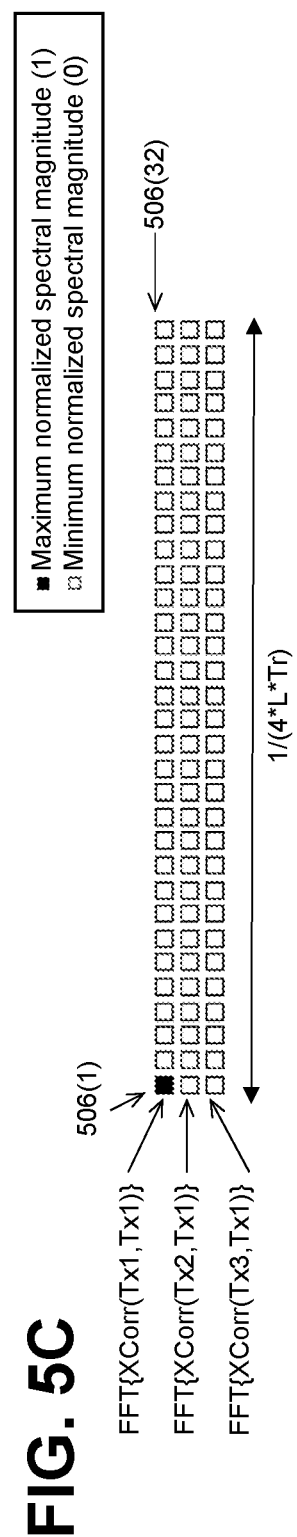
Figure 8A:
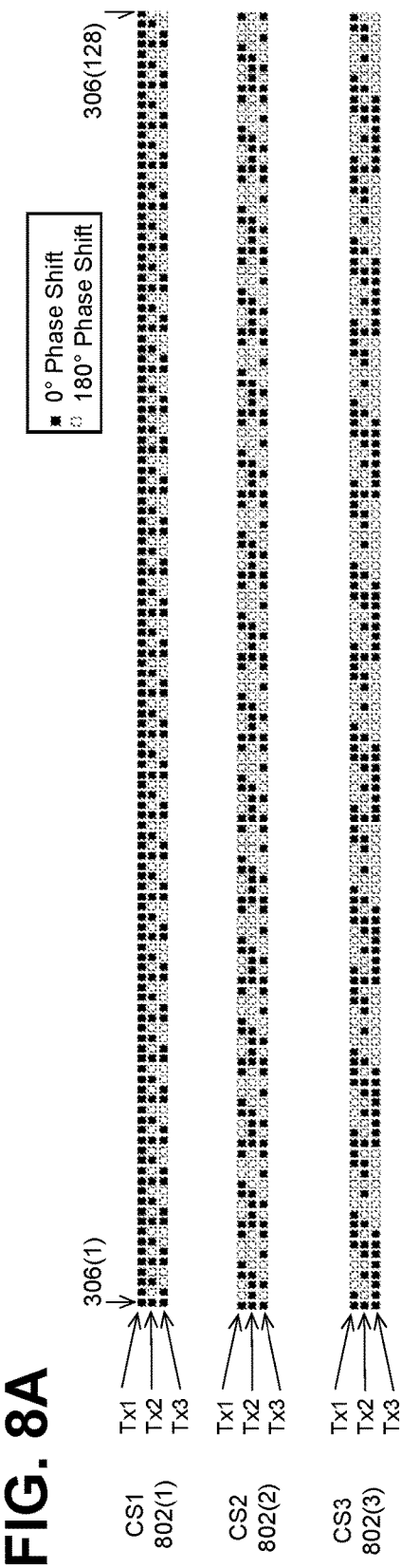
FIGS. 8A and 8B are graphical representations of ranging waveforms encoded according to multiple code sets for Doppler sidelobe peak mitigation, according to some embodiments of the present disclosure.
Figure 8B:
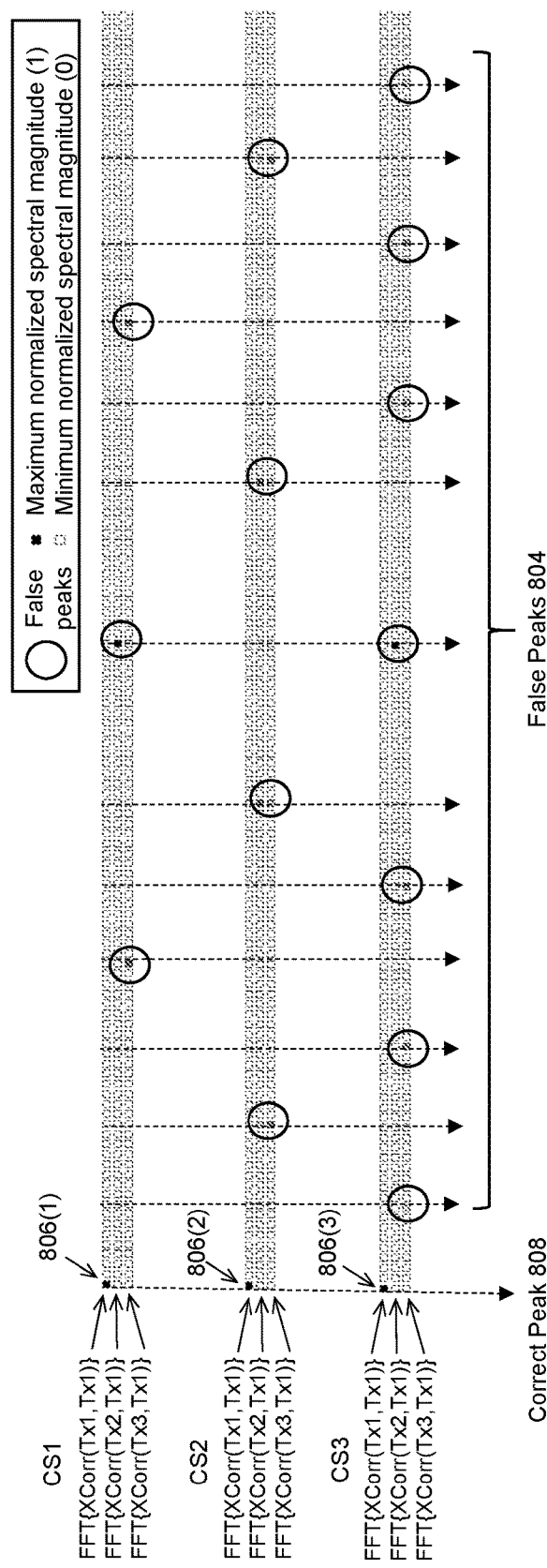

FIGS. 5A, 5B, and 5C show a conventional decoding process using a conventional length-4 Hadamard transmitter code set. FIGS. 6A, 6B, 6C, and 6D show a joint decoding and Doppler filtering process using an optimized transmitter code set. FIGS. 7A, 7B, and 7C show a joint decoding and Doppler filtering process using a conventional length-4 Hadamard transmitter code set. Other embodiments of the present disclosure are also shown in FIGS. 8A and 8B, which show false Doppler sidelobe peak mitigation using multiple code sets, and FIGS. 9A, 9B, 9C, and 9D, which show false Doppler sidelobe level suppression using multiple code set integration. Some aspects of the conventional transmitting coding and decoding process are omitted from discussion of these figures (which were discussed above), for the sake of explanation.

FIG. 5A illustrates an example of a length-4 Hadamard coded sequence for the case of 3 transmitters, Tx1, Tx2, and Tx3. Each box represents a ranging waveform block that has been coded according to a transmitter outer code chip, where the ranging waveform blocks coded with 0 degree phase shift are shown as filled-in boxes and the ranging waveform blocks coded with 180 degree phase shift are shown as clear boxes. The top row of boxes represents a first coded sequence CS for the first transmitter Tx1 (e.g., using $C_1$ of the Hadamard code), the middle row of boxes represents a second coded sequence for the second transmitter Tx2 (e.g., using $C_2$ of the Hadamard code), and the bottom row of boxes represents a third coded sequence for the third transmitter Tx3 (e.g., using $C_3$ of the Hadamard code). The three coded sequences CS(Tx1), CS(Tx2), and CS(Tx3) are transmitted simultaneously on the respective transmitter and each are repeated 32 times (or K=32), with a total of 128 ranging waveform blocks 306 for the entire dwell time. The PRI length is 4 ranging waveform blocks, resulting in 32 PRIs, where PRI 502 has a duration equal to 4*L*Tr.

The coded sequences of Tx1, Tx2, and Tx3 are received on a receiver and are decoded by decoder 122 by cross-correlating the sequences with transmitter Tx1's transmitter code $C_1$. The cross-correlation results of the three coded sequences are illustrated in FIG. 5B, respectively labeled as XCorr(Tx1,Tx1), XCorr(Tx2, Tx1), and XCorr(Tx3, Tx1). For each of the 4-block PRIs, one decoded output 504 is produced, resulting in 32 decoded outputs 504(1)-(32). Each box represents an output 504 having a normalized decoded magnitude, where the maximum normalized decoded magnitudes are shown as filled-in boxes and the minimum normalized decoded magnitudes are shown as clear boxes.

The 32 decoded outputs 504 are then passed through FFT filter bank of STMF 124 to produce the Doppler spectrum of K Doppler bins. The result of the filtering is illustrated in FIG. 5C, respectively labeled as FFT{XCorr(Tx1,Tx1)}, FFT{XCorr(Tx2, Tx1)}, and FFT{XCorr(Tx3, Tx1)}. Each box represents a spectral response having a normalized spectral magnitude, where the maximum normalized spectral magnitudes are shown as filled-in boxes and the minimum normalized spectral magnitudes are shown as clear boxes. In the example shown, zero Doppler shift is assumed, so the resulting spectrum shows a strongest spectral response at the zero Doppler bin 506(1) of transmitter Tx1's spectrum. It clearly shows the problem with the conventional coding scheme in which the maximum unambiguous Doppler shift is 1/(4*L*Tr) [Hz] due to the transmitter coding. Note that in this example, even when only 3 transmitters are encoded, a length-4 Hadamard code is used because of the limitation of the orthogonal code (length-3 Hadamard code does not exist).

Figure 6A:
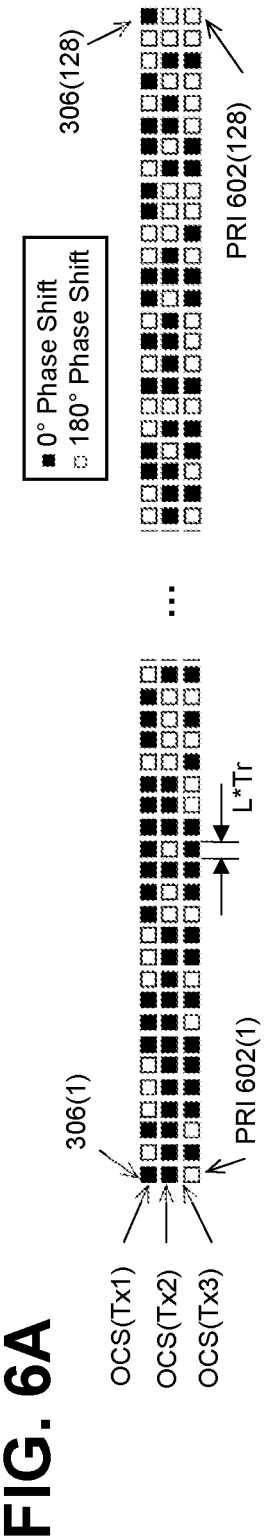
FIGS. 6A, 6B, 6C, and 6D are graphical representations of a ranging waveform encoded according to an optimized code set and processed by an example joint transmitter decoding and Doppler filtering process, according to some embodiments of the present disclosure.

FIG. 6A illustrates an example of a length-K coded sequence for the case of 3 transmitters. The example orthogonal BPSK transmitter code set OC having code length K=128 (as provided above under the heading Transmitter Coding) is used to code a K number of ranging waveform blocks for each transmitter. The top row of boxes represents a first optimized coded sequence OCS for the first transmitter Tx1 (e.g., using $OC_1$ of the optimized code set), the middle row of boxes represents a second optimized coded sequence OCS for the second transmitter Tx2 (e.g., using $OC_2$ of the optimized code set), and the bottom row of boxes represents a third optimized coded sequence OCS for the third transmitter Tx3 (e.g., using $OC_3$ of the optimized code set). The orthogonal code OC may be found by a number of ways, such as by random searching, by exhaustive search, or by any other guided search algorithm, based on the two optimization criteria provided above. No Doppler shift is assumed in this example. The three coded sequences OCS(Tx1), OCS(Tx2), and OCS(Tx3) are transmitted simultaneously on the respective transmitter, without need for repetition, with a total of 128 ranging waveform blocks filling the entire dwell time. The PRI length is one ranging waveform blocks, resulting in 128 PRIs, where PRI 602 has a duration equal to L*Tr.

Figure 6B:
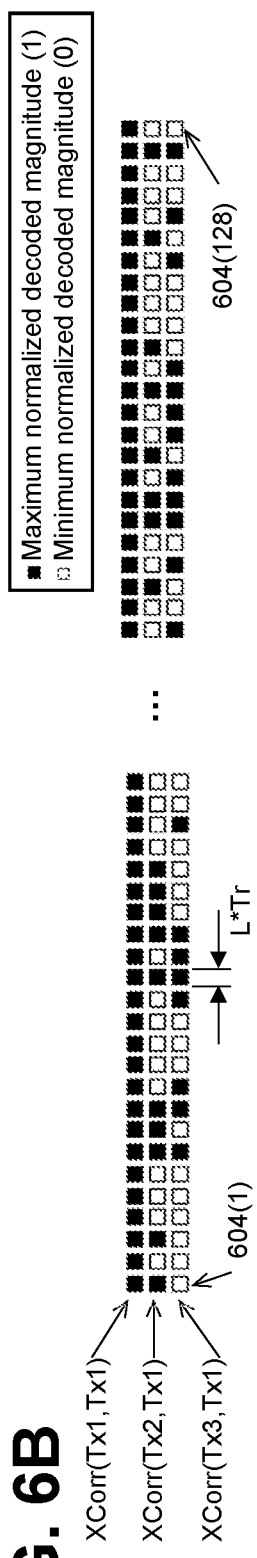

The sequences of Tx1, Tx2, and Tx3 are received on a receiver and are simultaneously decoded and Doppler filtered by the bank of combination filters of joint MF 222. An equivalent cross-correlation decode operation and Doppler filtering operation are shown in separate figures for the sake of explanation, even though they are performed simultaneously by joint MF 222. FIG. 6B illustrates the cross correlation of the sequences with transmitter Tx1's transmitter code $OC_1$, respectively labeled as XCorr(Tx1,Tx1), XCorr(Tx2, Tx1), and XCorr(Tx3, Tx1). A representative decoded output 604 is produced for each of the PRIs, resulting in 128 representative decoded outputs 604(1)-(128).

Figure 6C:
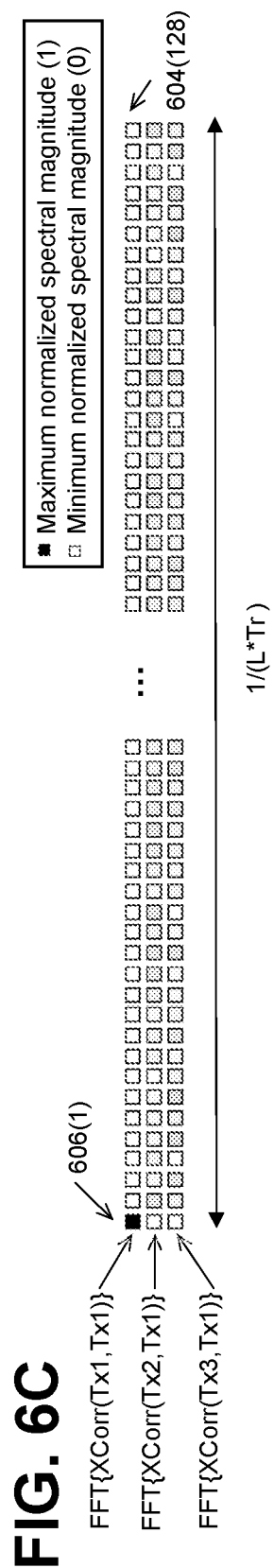
Figure 6D:
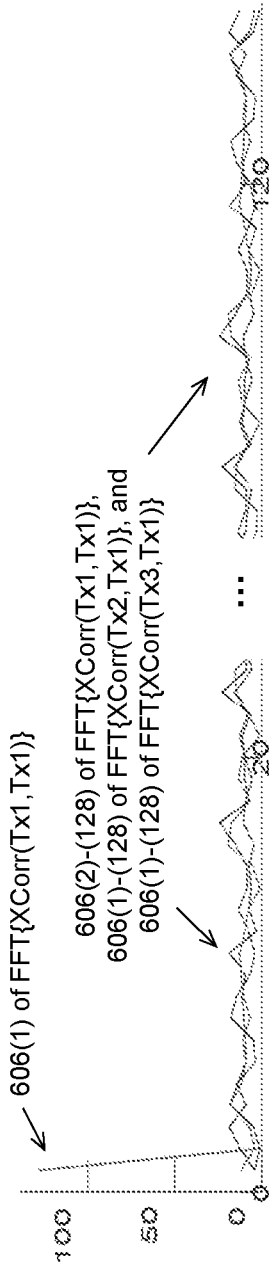

The cross correlation of Tx1's sequence with its own code results in a sequence of all 1's for XCorr (Tx1, Tx1), which result in a spectral peak at the zero Doppler bin 606(1) shown in FIG. 6C. The cross-correlation of Tx2's sequence with Tx1's code and the cross-correlation of Tx3's sequence with Tx1's code do not result in zero (as shown by the filled-in and clear boxes in FIG. 6B, indicating some code chips of the echo signal match code chips in the Tx2 and Tx3 codes), but they are also not periodic. The combination filters are also weighted using the complex conjugate of the transmitter code chips, resulting in spectral responses having normalized magnitudes less than the detection threshold for Tx2 and Tx3 in FIG. 6C. The maximum unambiguous Doppler shift is 1/Tr [Hz] due to the optimized transmitter coding. The cross-correlation periodicity is shown in the spectral analysis results illustrated in FIG. 6D, which shows low cross-correlation periodicity for the set of optimized codes OC. The spectral peak at the zero Doppler bin 606(1) can also be seen in FIG. 6D, while the spectral response of the other Doppler bins of the three sequences fall below the detection threshold, due to the spectral magnitudes being less than or equal to $\sqrt{K}$. No distinct sidelobes can be seen from the result. The average sidelobe level is also sufficiently low for resolving a largest-RCS (radar cross section) and a smallest-RCS target at the same range gate. Note that the dynamic range generally increases as the code length increases. In order to achieve higher dynamic range for the Doppler estimation, a longer code length can be used (but it is still subject to the coherent time). Additional process is required for further improving the dynamic range beyond what is allowed by the dwell time.

FIG. 7A illustrates an example of a set of orthogonal BPSK codes based on the length-4 Hadamard code, which is used to encode 128 ranging waveform blocks for the transmitter sequences labeled as CS(Tx1), CS(Tx2), and CS(Tx3). FIG. 7B shows the equivalent cross-correlation of each sequence with Tx1's code with representative decoded outputs 704(1)-(128), and FIG. 7C shows the corresponding spectral responses, with a spectral peak 706 correctly detected at the zero Doppler bin. As mentioned before, Hadamard code does not possess low periodicity in their cross correlation so it is not a suitable choice for the present disclosure. This can be seen in the Doppler spectrums of the cross correlations illustrated in FIG. 7C in which large distinct false Doppler peaks 708 are observed. Such strong false peaks are likely to result in false detections or shadow targets if no additional processing is attempted to mitigate the problem.

In another embodiment of present invention, multiple sets of codes are constructed and used in subsequent slow-time frames and the measurements are coherently integrated or tracked over the multiple measurement frames to enhance the dynamic range of the Doppler estimates and for suppressing the false peaks due to high periodicity in the cross correlations of the codes.

FIGS. 8A and 8B show false Doppler sidelobe peak mitigation using multiple non-optimized transmitter code sets. FIG. 8A shows three sets of non-optimized transmitter codes, such as Hadamard transmitter outer codes, code set 1 (CS1) 802(1), code set 2 (CS2) 802(2), and code set 3 (CS3) 802(3). The Hadamard codes are implemented on three transmitters and are repeated in sequence during the Doppler waveform blocks or frames. For example, transmitters Tx1, Tx2, and Tx3 use a respective code of CS1 for a first Doppler frame, a respective code of CS2 for a second Doppler frame, and a respective code of CS3 for a third Doppler frame. The order then repeats, where transmitters TX1, Tx2, and Tx3 then use their respective code of CS1 for a fourth Doppler frame, their respective code of CS2 for a fifth Doppler frame, and their respective code of CS3 for a sixth Doppler frame.

In the embodiment shown, the different non-optimized code sets have different code lengths, such as CS1 802(1) that repeats every 4 ranging waveform blocks (e.g., a length-4 code), CS2 802(2) that repeats every 8 ranging waveform blocks (e.g., a length-8 code), and CS3 802(3) that repeats every 16 ranging waveform blocks (e.g., a length-16 code). FIG. 8B shows the resulting Doppler spectrums of each of the three code sets CS1, CS2, and CS3, labeled as FFT{XCorr(Tx1, Tx1)}, FFT{XCorr(Tx2, Tx1)}, and FFT{XCorr(Tx3, Tx1)}. The presence of the false peaks 804 may be clearly observed (and are highlighted by a large circle surrounding each false peak), where the false peak positions are inconsistent across the three non-optimized code sets, such as when only one false peak may be present at any given point in time, as indicated by the dashed arrows across the three Doppler spectrums. However, the relative positions of the false peaks are consistent with respect to each code, and can be seen repeating in time throughout each individual Doppler spectrum of the respective code set. The true peak positions 806(1)-(3) are consistent across the three code sets with a correct spectral peak 808 detected at the zero Doppler bin. As a result, tracking algorithms can be applied to suppress the false detections from the false peaks due to their inconsistent detections. By means of employing different non-optimized code sets throughout multiple detection frames, the effect from the false Doppler peaks can be suppressed.

FIGS. 9A, 9B, 9C, and 9D show false Doppler sidelobe level suppression using multiple code set integration. FIG. 9A shows two optimized code sets, OCS1 902(1) and OCS2 902(2), which were randomly searched sets of optimized transmitter outer codes. FIG. 9B shows the resulting Doppler spectrum 910(1) and associated spectral analysis results 912(1) for OCS1 and FIG. 9C shows the resulting Doppler spectrum 910(2) and associated spectral analysis results 912(2) for OSC2. Spectral peaks 904(1) and 904(2) can be seen in each zero Doppler bin for OCS1 and OCS2, and can be seen as peaks 906(1) and 906(2) in the spectral analysis results for OCS1 and OCS2. The spectral response of the other Doppler bins for the three sequences in OCS1 and OCS2 fall below the detection threshold, due to the spectral magnitudes being less than or equal to the detection threshold such as $\sqrt{K}$ in some embodiments. The random optimized code sets result in low cross-correlation periodicity, which can be seen as even or low Doppler sidelobe levels through the rest of the spectral analysis results 912(1) and 912(2). For example, the mean spectral magnitude of the spectral analysis results 912(1) and 912(2) is approximately 0.07848 for OCS1, and approximately 0.080106 for OCS2.

FIG. 9D shows an integration 914 of the spectral analysis results 912(1) and 912(2), which are coherently summed (i.e., by vector sum). The true target peak will be summed constructively, seen as peak 908, while the sidelobes will be summed in a random fashion, resulting in an SNR (signal to noise ratio) gain of 3 dB. For example, the mean spectral magnitude of the integrated results 914 is approximately 0.56341. The example result 914 shows an approximate 3 dB gain (e.g., 2.9682 dB Doppler sidelobe suppression) can be obtained by summing the Doppler spectrums from two code sets. The SNR gain or dynamic range improvement is a function of the number of code sets that are integrated and equals to $\sqrt{Q}$ in amplitude or $10*\log 10(Q)$ in [dB], where Q is the number of code sets that are integrated.

The circuitry described herein that implements radar system 200 may be implemented on a semiconductor substrate, which can be any semiconductor material or combinations of materials, such as gallium arsenide, silicon germanium, silicon-on-insulator (SOI), silicon, monocrystalline silicon, the like, and combinations of the above. The active circuitry for the radar system 200 on a die is formed using a sequence of numerous process steps applied to a semiconductor substrate, such as a semiconductor wafer, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like. Examples of integrated circuit components include but are not limited to a processor, memory, logic, analog circuitry, sensor, MEMS (microelectromechanical systems) device, a standalone discrete device such as a resistor, inductor, capacitor, diode, power transistor, and the like. In some embodiments, the active circuitry may be a combination of the integrated circuit components listed above or may be another type of microelectronic device. In some embodiments, the active circuitry includes an LDMOS (laterally diffused metal oxide semiconductor) transistor.

By now it should be appreciated that there has been provided an optimized transmitter coding scheme and optimized joint transmitter decoding and Doppler filtering scheme, which involves first choosing a set of transmitter codes that are orthogonal to each other and whose cross correlations are less periodic in nature and with a code length equal to the number of Doppler bins allowable by the dwell time; and secondly by complexly weighting the Doppler filters using the complex conjugates of the orthogonal codes as weights.

In one embodiment of the present disclosure, a radar system is provided, which includes: an N number of transmit antennas; and an N number of phase shift keying (PSK) coders, each of the N PSK coders assigned a respective optimized transmitter code of a set of optimized transmitter codes, wherein each optimized transmitter code of the set includes a sequence of K code chips, each optimized transmitter code of the set is orthogonal to every other optimized transmitter code of the set, spectral analysis of a cross-correlation between any two optimized transmitter codes results in sidelobes having a value no greater than a predetermined detection threshold, each PSK coder is configured to encode a K number of ranging waveform blocks according to the sequence of K code chips of the respective optimized transmitter code and produce a respective optimized coded sequence, and each of the N transmit antennas is configured to output the respective optimized coded sequence at the same time.

One aspect of the above embodiment provides that the respective optimized coded sequence is transmitted once to form a Doppler frame, and the sequence of K code chips used to code the respective optimized coded sequence is never repeated during the Doppler frame.

A further aspect of the above embodiment provides that a pulse repetition interval (PRI) has a duration equal to or greater than a duration of the ranging waveform block, a K number of PRIs are completed during the Doppler frame, a Doppler measurement resolution of the radar system is $1/(K*PRI)$, and a maximum unambiguous Doppler shift measurable by the radar system is $+/-0.5*(1/PRI)$.

Another further aspect of the above embodiment provides that the Doppler frame is less than or equal to a dwell time, the dwell time is a maximum amount of time in which an echo signal is coherently processed by the radar system, and K is an integer number of Doppler bins that are allowable during the dwell time.

Another aspect of the above embodiment provides that the set of optimized transmitter codes includes a set of binary phase shift keying (BPSK) transmitter codes, and the predetermined detection threshold is less than or equal to $\sqrt{K}$.

Another aspect of the above embodiment provides that the radar system further includes: an M number of receive antennas configured to receive reflected optimized coded sequences that were transmitted by one or more of the N transmit antennas and reflected off of a target, wherein each echo signal's original optimized coded sequence includes a sequence of K ranging waveform blocks that are encoded according to a sequence of K code chips of a particular optimized transmitter code, each ranging waveform block including an L number of unit ranging waveforms; an M number of fast time matched filters (FTMF), each FTMF including a bank of J range gates, each J range gate including L filters, each J range gate tuned to a respective range, wherein the J range gates are configured to sort the echo signals into J range bins; an M number of summer blocks, each summer block configured to sum a set of J*L outputs into J range gate outputs; and an M number of joint matched filters, each of the M joint matched filters implementing N*K combination filters for each of the J range gate outputs, for a total of N*K*J combination filters, wherein each of the N*K*J combination filters is configured to simultaneously perform decoding and Doppler filtering of an echo signal.

A further aspect of the above embodiment provides that for each of the J range gate outputs: the N*K combination filters are grouped into N groups, each N group having K combination filters, each of the N groups is associated with a distinct optimized transmitter code of the set of optimized transmitter codes, each of the K combination filters in a given group is tuned to a respective Doppler shift, and each of the K combination filters in the given group is weighted with a complex conjugate of a respective code chip of the distinct optimized transmitter code.

A still further aspect of the above embodiment provides that for each of the J range gate outputs: for each of the N groups: each K combination filter is configured to multiply a respective code chip of a particular optimized transmitter code of a given echo signal by the complex conjugate of a respective code chip of the distinct optimized transmitter code, and each of the K combination filters is configured to output a correlation signal.

A still yet further aspect of the above embodiment provides that for each of the J range gate outputs: for each of the N groups: a correlation peak is detected when a sum of the outputs of the K combination filters is greater than the predetermined detection threshold, and the correlation peak indicates that all code chips of the particular optimized transmitter code of the echo signal matches all code chips of the distinct optimized transmitter code.

Another further aspect of the above embodiment provides that the N*K*J combination filters are implemented with Fast Fourier transform (FFT) filters.

In another embodiment of the present disclosure, a radar system is provided, which includes: an N number of transmit antennas; an M number of receive antennas configured to receive reflected optimized coded sequences that were transmitted by one or more of the N transmit antennas and reflected off of a target, wherein each echo signal's original optimized coded sequence includes a sequence of K ranging waveform blocks that are encoded according to a sequence of K code chips of a particular optimized transmitter code, each ranging waveform block including an L number of unit ranging waveforms; an M number of fast time matched filters (FTMF), each FTMF including a bank of J range gates, each J range gate including L filters, each J range gate tuned to a respective range, wherein the J range gates are configured to sort the echo signals into J range bins; an M number of summer blocks, each summer block configured to sum a set of J*L outputs into J range gate outputs; and an M number of joint matched filters, each of the M joint matched filters implementing N*K combination filters for each of the J range gate outputs, for a total of N*K*J combination filters, wherein each of the N*K*J combination filters is configured to simultaneously perform decoding and Doppler filtering of an echo signal.

One aspect of the above embodiment provides that each of the N transmit antennas is assigned a respective optimized transmitter code of a set of optimized transmitter codes, each optimized transmitter code of the set includes a sequence of K code chips, each optimized transmitter code of the set is orthogonal to every other optimized transmitter code of the set, and spectral analysis of a cross-correlation between any two optimized transmitter codes results in sidelobes having a value no greater than a predetermined detection threshold.

A further aspect of the above embodiment provides that for each of the J range gate outputs: the N*K combination filters are grouped into N groups, each N group having K combination filters, each of the N groups is associated with a distinct optimized transmitter code of the set of optimized transmitter codes, each of the K combination filters in a given group is tuned to a respective Doppler shift, and each of the K combination filters in the given group is weighted with a complex conjugate of a respective code chip of the distinct optimized transmitter code.

A still further aspect of the above embodiment provides that for each of the J range gate outputs: for each of the N groups: each K combination filter is configured to multiply a respective code chip of a particular optimized transmitter code of a given echo signal by the complex conjugate of a respective code chip of the distinct optimized transmitter code, and each of the K combination filters is configured to output a correlation signal.

A still yet further aspect of the above embodiment provides that for each of the J range gate outputs: for each of the N groups: a correlation peak is detected when a sum of the outputs of the K combination filters is greater than the predetermined detection threshold, and the correlation peak indicates that all code chips of the particular optimized transmitter code of the echo signal matches all code chips of the distinct optimized transmitter code.

Another aspect of the above embodiment provides that the N*K*J combination filters are implemented with Fast Fourier transform (FFT) filters.

Another further aspect of the above embodiment provides that the radar system further includes: a waveform generator configured to produce unit ranging waveforms; a waveform concatenator configured to concatenate an L number of unit ranging waveforms to form a ranging waveform block; and an N number of phase shift keying (PSK) coders, each of the N PSK coders assigned the respective optimized transmitter code of the set of optimized transmitter codes and configured to encode a K number of ranging waveform blocks according to the respective optimized transmitter code to form a respective optimized coded sequence.

A still further aspect of the above embodiment provides that the respective optimized transmitter code is a first respective optimized transmitter code, the set of optimized transmitter codes is a first set of optimized transmitter codes, each of the N PSK coders are further assigned a second respective optimized transmitter code from a second set of optimized transmitter codes having code length K, each of the N PSK coders configured to encode a K number of ranging waveform blocks according to the second respective optimized transmitter code to form a second respective optimized coded sequence, a first spectral analysis of a first cross-correlation between any of the first set of optimized transmitter codes with the first respective optimized transmitter code are coherently summed with a second spectral analysis of a second cross-correlation between any of the second set of optimized transmitter codes with the second respective optimized transmitter code to result in an integrated spectral analysis, wherein any peaks that correspond to consistent Doppler bins across both the first and second spectral analyses are summed constructively to produce a correct peak in the integrated spectral analysis, any false peaks that correspond to inconsistent Doppler bins across the first and second spectral analyses are suppressed.

In another embodiment of the present disclosure, a radar system is provided, which includes: an N number of transmit antennas; a waveform generator configured to produce unit ranging waveforms; a waveform concatenator configured to concatenate an L number of unit ranging waveforms to form a ranging waveform block; and an N number of phase shift keying (PSK) coders, wherein each of the N PSK coders are assigned a first respective non-optimized transmitter code from a first set of non-optimized transmitter codes having a code length less than K, each of the N PSK coders are configured to repeat the first respective non-optimized transmitter code to encode a K number of ranging waveform blocks to form a first respective non-optimized coded sequence, each of the N PSK coders are further assigned a second respective non-optimized transmitter code from a second set of non-optimized transmitter codes having a code length less than K, each of the N PSK coders are configured to repeat the second respective non-optimized transmitter code to encode a K number of ranging waveform blocks to form a second respective non-optimized coded sequence, a first spectral analysis of a cross-correlation between any of the first set of non-optimized transmitter codes with the first respective non-optimized transmitter code results in a first plurality of peaks, a second spectral analysis of a cross-correlation between any of the second set of non-optimized transmitter codes with the second respective non-optimized transmitter code results in a second plurality of peaks, a spectral tracking algorithm indicates that any peaks that correspond to consistent Doppler bins across the first and second spectral analyses indicate a correct peak, and any peaks that correspond to inconsistent Doppler bins across the first and second spectral analyses are suppressed.

One aspect of the above embodiment provides that a Doppler filter on a receiver that receives echo signals of non-optimized coded sequences has a filter length of K samples, the first and second sets of non-optimized transmitter codes are Hadamard codes, the non-optimized transmitter codes in the first set each have a first code length, and the non-optimized transmitter codes in the second set each have a second code length that is twice as long as the first code length.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, the terms "substantial" and "substantially" mean sufficient to achieve the stated purpose or value in a practical manner, taking into account any minor imperfections or deviations, if any, that arise from usual and expected process abnormalities that may occur during wafer fabrication, which are not significant for the stated purpose or value. Also as used herein, the terms "approximately" or "approximating" mean a value close to or within an acceptable range of an indicated value, amount, or quality, which also includes the exact indicated value itself.

Although the invention is described herein with reference to specific embodiments, various modifications and changes can be made without departing from the scope of the present invention as set forth in the claims below. For example, additional or fewer transmitters and receivers may be implemented in FIG. 2. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radar system comprising:
an N number of transmit antennas; and
an N number of phase shift keying (PSK) coders, each of the N PSK coders assigned a respective optimized transmitter code of a set of optimized transmitter codes, wherein
each optimized transmitter code of the set comprises a sequence of K code chips,
each optimized transmitter code of the set is orthogonal to every other optimized transmitter code of the set,
spectral analysis of a cross-correlation between any two optimized transmitter codes results in sidelobes having a value no greater than a predetermined detection threshold that is less than a sidelobe value of a cross-correlation of two matching transmitter codes,
each PSK coder is configured to encode a K number of ranging waveform blocks according to the sequence of K code chips of the respective optimized transmitter code and produce a respective optimized coded sequence, and
each of the N transmit antennas is configured to output the respective optimized coded sequence at the same time.

2. The radar system of claim 1, wherein
the respective optimized coded sequence is transmitted once to form a Doppler frame, and the sequence of K code chips used to code the respective optimized coded sequence is never repeated during the Doppler frame.

3. The radar system of claim 2, wherein
the Doppler frame is less than or equal to a dwell time,
the dwell time is a maximum amount of time in which an echo signal is coherently processed by the radar system, and
K is an integer number of Doppler bins that are allowable during the dwell time.

4. The radar system of claim 1, wherein
the set of optimized transmitter codes comprises a set of binary phase shift keying (BPSK) transmitter codes, and
the predetermined detection threshold is less than or equal to $\sqrt{K}$.

5. The radar system of claim 1, wherein
the predetermined detection threshold is less than or equal to $\sqrt{K}$.

6. A radar system comprising:
an N number of transmit antennas; and
an N number of phase shift keying (PSK) coders, each of the N PSK coders assigned a respective optimized transmitter code of a set of optimized transmitter codes, wherein
each optimized transmitter code of the set comprises a sequence of K code chips,
each optimized transmitter code of the set is orthogonal to every other optimized transmitter code of the set,
spectral analysis of a cross-correlation between any two optimized transmitter codes results in sidelobes having a value no greater than a predetermined detection threshold,
each PSK coder is configured to encode a K number of ranging waveform blocks according to the sequence of K code chips of the respective optimized transmitter code and produce a respective optimized coded sequence, and
each of the N transmit antennas is configured to output the respective optimized coded sequence at the same time,
wherein
the respective optimized coded sequence is transmitted once to form a Doppler frame, and
the sequence of K code chips used to code the respective optimized coded sequence is never repeated during the Doppler frame,
a pulse repetition interval (PRI) has a duration equal to or greater than a duration of the ranging waveform block,
a K number of PRIs are completed during the Doppler frame,
a Doppler measurement resolution of the radar system is 1/(K*PRI), and
a maximum unambiguous Doppler shift measurable by the radar system is +/−0.5*(1/PRI).

7. A radar system comprising:
an N number of transmit antennas; and
an N number of phase shift keying (PSK) coders, each of the N PSK coders assigned a respective optimized transmitter code of a set of optimized transmitter codes, wherein
each optimized transmitter code of the set comprises a sequence of K code chips,
each optimized transmitter code of the set is orthogonal to every other optimized transmitter code of the set,
spectral analysis of a cross-correlation between any two optimized transmitter codes results in sidelobes having a value no greater than a predetermined detection threshold,
each PSK coder is configured to encode a K number of ranging waveform blocks according to the sequence of K code chips of the respective optimized transmitter code and produce a respective optimized coded sequence, and
each of the N transmit antennas is configured to output the respective optimized coded sequence at the same time,
wherein the radar system further comprising:
an M number of receive antennas configured to receive reflected optimized coded sequences that were transmitted by one or more of the N transmit antennas and reflected off of a target, wherein
each echo signal's original optimized coded sequence comprises a sequence of K ranging waveform blocks that are encoded according to a sequence of K code chips of a particular optimized transmitter code, each ranging waveform block comprising an L number of unit ranging waveforms;
an M number of fast time matched filters (FTMF), each FTMF comprising a bank of J range gates, each J range gate comprising L filters, each J range gate tuned to a respective range, wherein the J range gates are configured to sort the echo signals into J range bins;
an M number of summer blocks, each summer block configured to sum a set of J*L outputs into J range gate outputs; and
an M number of joint matched filters, each of the M joint matched filters implementing N*K combination filters for each of the J range gate outputs, for a total of N*K*J combination filters, wherein
each of the N*K*J combination filters is configured to simultaneously perform decoding and Doppler filtering of an echo signal.

8. The radar system of claim 7, wherein
for each of the J range gate outputs:
the N*K combination filters are grouped into N groups, each N group having K combination filters,
each of the N groups is associated with a distinct optimized transmitter code of the set of optimized transmitter codes,
each of the K combination filters in a given group is tuned to a respective Doppler shift, and
each of the K combination filters in the given group is weighted with a complex conjugate of a respective code chip of the distinct optimized transmitter code.

9. The radar system of claim 8, wherein
for each of the J range gate outputs:
for each of the N groups:
each K combination filter is configured to multiply a respective code chip of a particular optimized transmitter code of a given echo signal by the complex conjugate of a respective code chip of the distinct optimized transmitter code, and
each of the K combination filters is configured to output a correlation signal.

10. The radar system of claim 9, wherein
for each of the J range gate outputs:
for each of the N groups:
a correlation peak is detected when a sum of the outputs of the K combination filters is greater than the predetermined detection threshold, and the correlation peak indicates that all code chips of the particular optimized transmitter code of the echo signal matches all code chips of the distinct optimized transmitter code.

11. The radar system of claim 7, wherein the N*K*J combination filters are implemented with Fast Fourier transform (FFT) filters.

12. A radar system comprising:
an N number of transmit antennas;
an M number of receive antennas configured to receive reflected optimized coded sequences that were transmitted by one or more of the N transmit antennas and reflected off of a target, wherein
   each echo signal's original optimized coded sequence comprises a sequence of K ranging waveform blocks that are encoded according to a sequence of K code chips of a particular optimized transmitter code, each ranging waveform block comprising an L number of unit ranging waveforms;
an M number of fast time matched filters (FTMF), each FTMF comprising a bank of J range gates, each J range gate comprising L filters, each J range gate tuned to a respective range, wherein the J range gates are configured to sort the echo signals into J range bins;
an M number of summer blocks, each summer block configured to sum a set of J*L outputs into J range gate outputs; and
an M number of joint matched filters, each of the M joint matched filters implementing N*K combination filters for each of the J range gate outputs, for a total of N*K*J combination filters, wherein
   each of the N*K*J combination filters is configured to simultaneously perform decoding and Doppler filtering of an echo signal.

13. The radar system of claim 12, wherein
each of the N transmit antennas is assigned a respective optimized transmitter code of a set of optimized transmitter codes,
each optimized transmitter code of the set comprises a sequence of K code chips,
each optimized transmitter code of the set is orthogonal to every other optimized transmitter code of the set, and
spectral analysis of a cross-correlation between any two optimized transmitter codes results in sidelobes having a value no greater than a predetermined detection threshold.

14. The radar system of claim 13, wherein
for each of the J range gate outputs:
   the N*K combination filters are grouped into N groups, each N group having K combination filters,
   each of the N groups is associated with a distinct optimized transmitter code of the set of optimized transmitter codes,
   each of the K combination filters in a given group is tuned to a respective Doppler shift, and
   each of the K combination filters in the given group is weighted with a complex conjugate of a respective code chip of the distinct optimized transmitter code.

15. The radar system of claim 14, wherein
for each of the J range gate outputs:
   for each of the N groups:
      each K combination filter is configured to multiply a respective code chip of a particular optimized transmitter code of a given echo signal by the complex conjugate of a respective code chip of the distinct optimized transmitter code, and
      each of the K combination filters is configured to output a correlation signal.

16. The radar system of claim 15, wherein
for each of the J range gate outputs:
   for each of the N groups:
      a correlation peak is detected when a sum of the outputs of the K combination filters is greater than the predetermined detection threshold, and
      the correlation peak indicates that all code chips of the particular optimized transmitter code of the echo signal matches all code chips of the distinct optimized transmitter code.

17. The radar system of claim 13, further comprising:
a waveform generator configured to produce unit ranging waveforms;
a waveform concatenator configured to concatenate an L number of unit ranging waveforms to form a ranging waveform block; and
an N number of phase shift keying (PSK) coders, each of the N PSK coders assigned the respective optimized transmitter code of the set of optimized transmitter codes and configured to encode a K number of ranging waveform blocks according to the respective optimized transmitter code to form a respective optimized coded sequence.

18. The radar system of claim 17, wherein
the respective optimized transmitter code is a first respective optimized transmitter code,
the set of optimized transmitter codes is a first set of optimized transmitter codes,
each of the N PSK coders are further assigned a second respective optimized transmitter code from a second set of optimized transmitter codes having code length K, each of the N PSK coders configured to encode a K number of ranging waveform blocks according to the second respective optimized transmitter code to form a second respective optimized coded sequence,
a first spectral analysis of a first cross-correlation between any of the first set of optimized transmitter codes with the first respective optimized transmitter code are coherently summed with a second spectral analysis of a second cross-correlation between any of the second set of optimized transmitter codes with the second respective optimized transmitter code to result in an integrated spectral analysis, wherein
   any peaks that correspond to consistent Doppler bins across both the first and second spectral analyses are summed constructively to produce a correct peak in the integrated spectral analysis,
   any false peaks that correspond to inconsistent Doppler bins across the first and second spectral analyses are suppressed.

19. The radar system of claim 12, wherein
the N*K*J combination filters are implemented with Fast Fourier transform (FFT) filters.

20. A radar system comprising:
an N number of transmit antennas;
a waveform generator configured to produce unit ranging waveforms;
a waveform concatenator configured to concatenate an L number of unit ranging waveforms to form a ranging waveform block; and
an N number of phase shift keying (PSK) coders, wherein
   each of the N PSK coders are assigned a first respective non-optimized transmitter code from a first set of non-optimized transmitter codes having a code length less than K, each of the N PSK coders are configured to repeat the first respective non-optimized transmitter code to encode a K number of ranging waveform blocks to form a first respective non-optimized coded sequence, each of the N PSK coders are further assigned a second respective non-optimized transmitter code from a second set of non-optimized transmitter codes having a code length less than K, each of the N PSK coders are configured to repeat the second respective non-optimized transmitter code to encode a K number of ranging waveform blocks to form a second respective non-optimized coded sequence, an M number of receivers, wherein each of the M number of receivers is configured to perform on received echo signals:

a first spectral analysis of a cross-correlation between any of the first set of non-optimized transmitter codes with the first respective non-optimized transmitter code results in a first plurality of peaks, a second spectral analysis of a cross-correlation between any of the second set of non-optimized transmitter codes with the second respective non-optimized transmitter code results in a second plurality of peaks, a spectral tracking algorithm that indicates that any peaks that correspond to consistent Doppler bins across the first and second spectral analyses indicate a correct peak, and wherein any peaks that correspond to inconsistent Doppler bins across the first and second spectral analyses are suppressed.

21. The radar system of claim 20, wherein a Doppler filter on a receiver of the M number of receivers that receives echo signals of non-optimized coded sequences has a filter length of K samples, the first and second sets of non-optimized transmitter codes are Hadamard codes, the non-optimized transmitter codes in the first set each have a first code length, and the non-optimized transmitter codes in the second set each have a second code length that is twice as long as the first code length.

* * * * *